US012600265B2

(12) United States Patent
Asakura et al.

(10) Patent No.: US 12,600,265 B2
(45) Date of Patent: Apr. 14, 2026

(54) POWER SUPPLY DEVICE, ELECTRIC VEHICLE PROVIDED WITH POWER SUPPLY DEVICE, AND POWER STORAGE DEVICE

(71) Applicant: SANYO Electric Co., Ltd., Osaka (JP)

(72) Inventors: Jun Asakura, Hyogo (JP); Junya Yano, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 930 days.

(21) Appl. No.: 17/758,967

(22) PCT Filed: Sep. 15, 2020

(86) PCT No.: PCT/JP2020/034801
§ 371 (c)(1),
(2) Date: Nov. 28, 2022

(87) PCT Pub. No.: WO2021/149298
PCT Pub. Date: Jul. 29, 2021

(65) Prior Publication Data
US 2023/0150397 A1     May 18, 2023

(30) Foreign Application Priority Data

Jan. 23, 2020    (JP) ................................ 2020-009517

(51) Int. Cl.
*B60L 58/22*      (2019.01)
*B60L 58/14*      (2019.01)
*B60L 58/26*      (2019.01)

(52) U.S. Cl.
CPC .............. *B60L 58/22* (2019.02); *B60L 58/14* (2019.02); *B60L 58/26* (2019.02)

(58) Field of Classification Search
CPC .......... B60L 58/22; B60L 58/14; B60L 58/26; H01M 50/209; H01M 2010/4278;
(Continued)

(56) References Cited

U.S. PATENT DOCUMENTS 6,182,807 B1 * 2/2001 Saito ........................ F16F 15/02
191/2
11,251,638 B2 * 2/2022 Chiu ................... H02J 7/00714
(Continued)

FOREIGN PATENT DOCUMENTS

CN        104253469 B  *  3/2017  ................ H02J 7/00
EP          2565959 A2 *  3/2013  .......... H01M 10/482
(Continued)

OTHER PUBLICATIONS

Extended (Supplementary) European Search Report dated Oct. 19, 2023, issued in counterpart EP Application No. 20914810.5.(8 pages).
(Continued)

*Primary Examiner* — M Baye Diao
(74) *Attorney, Agent, or Firm* — WHDA, LLP

(57) ABSTRACT
A power supply device connects a plurality of battery modules including a plurality of battery cells by power line. Battery module includes cell monitor circuit that detects battery information, and a plurality of cell monitor circuits provided in each battery module are cascade-connected via communication line. Cell monitor circuit includes communication interface including connection parts formed by connecting communication line, and communication interface sets a withstand voltage applied to connection part to be higher than an output voltage of the power supply device.

15 Claims, 15 Drawing Sheets

(58) Field of Classification Search
CPC ............. H01M 10/425; H01M 10/441; H01M
10/482; H01M 50/204; H01M 50/249;
H01M 50/298; H01M 2220/20; Y02E
60/10; H02J 2310/48; H02J 7/0047; H02J
7/0013
USPC ........................................................ 320/134
See application file for complete search history.

(56) References Cited

U.S. PATENT DOCUMENTS

| | | | |
|---|---|---|---|
| 2001/0028241 A1 | 10/2001 | Saito et al. | |
| 2009/0198399 A1* | 8/2009 | Kubo | H02J 7/00309 |
| | | | 701/22 |
| 2012/0019061 A1 | 1/2012 | Nishihara et al. | |
| 2012/0161677 A1* | 6/2012 | Kunimitsu | H01M 50/284 |
| | | | 320/134 |
| 2012/0286706 A1* | 11/2012 | Ohkura | H01M 50/209 |
| | | | 320/135 |
| 2012/0286794 A1* | 11/2012 | Firehammer | H01M 10/441 |
| | | | 324/434 |
| 2013/0002016 A1 | 1/2013 | Furukawa et al. | |
| 2013/0059182 A1 | 3/2013 | Komatsu et al. | |
| 2013/0187610 A1* | 7/2013 | Hayashi | H02J 7/00 |
| | | | 320/118 |
| 2015/0137824 A1 | 5/2015 | Nishihara | |
| 2017/0229902 A1 | 8/2017 | Kamikawa et al. | |
| 2018/0241224 A1* | 8/2018 | Okamoto | G06F 13/16 |
| 2019/0027952 A1 | 1/2019 | Saito | |

FOREIGN PATENT DOCUMENTS

| | | | | |
|---|---|---|---|---|
| JP | 2003-047111 | 2/2003 | | |
| JP | 2015187915 A | * 10/2015 | ......... | H01M 50/209 |
| JP | 2017-147866 | 8/2017 | | |
| JP | 2019-205038 | 11/2019 | | |
| WO | 1996/026570 | 8/1996 | | |
| WO | 2010/113455 | 10/2010 | | |
| WO | 2011/024477 A1 | 3/2011 | | |
| WO | 2012/053426 | 4/2012 | | |
| WO | 2012/120745 | 9/2012 | | |
| WO | 2014/024452 | 2/2014 | | |
| WO | WO-2014024435 A1 | * 2/2014 | ......... | H01M 50/209 |
| WO | 2017/175496 | 10/2017 | | |

OTHER PUBLICATIONS

International Search Report of PCT application No. PCT/JP2020/
034801 dated Dec. 15, 2020.

* cited by examiner

POWER SUPPLY DEVICE, ELECTRIC VEHICLE PROVIDED WITH POWER SUPPLY DEVICE, AND POWER STORAGE DEVICE

TECHNICAL FIELD

The present invention relates to a power supply device including a plurality of battery modules, an electric vehicle and a power storage device including the power supply device, and in particular, to a power supply device for a motor that is mounted on an electric vehicle such as a hybrid car, an electric car, a fuel battery car, or an electric motorcycle and drives the vehicle or a power supply device for a large current used for power storage applications or the like for a house or a factory, and an electric vehicle and a power storage device including the power supply device.

BACKGROUND ART

In a power supply device, a charge and discharge capacity and an output current can be increased by connecting a plurality of battery modules are connected in series or in parallel. This power supply device is used as a power supply for a vehicle such as a hybrid car and an electric car, a power source for a power storage system for a factory, a house, or the like. The battery module used for this power supply device has been developed (see, for example, PTL 1).

As illustrated in an exploded perspective view of FIG. 14, the battery module includes battery stack 902 formed by stacking a plurality of battery cells 901, and cell monitor circuits 906 connected to battery stack 902 to detect battery information such as a voltage of battery cell 901. Battery modules 910 are connected to each other in series or in parallel and are used for a high-output power supply device. In this power supply device, the cell monitor circuits that detect the battery information of the plurality of battery modules are cascade-connected to transmit the battery information to an external battery control unit (BCU) or the like. The power supply device that cascade-connects the plurality of cell monitor circuits can transmit the battery information to the outside through one communication line while including the plurality of battery modules.

CITATION LIST

Patent Literature

PTL 1: WO 2014/024452

SUMMARY OF THE INVENTION

The power supply device in which the cell monitor circuits of the plurality of battery modules are cascade-connected by the communication line can transmit the battery information and the like to the outside by one communication line, but in this power supply device, battery modules 810 connected in series by power line 842 are cascade-connected by communication line 844 as illustrated in a schematic configuration diagram of FIG. 15. In power supply device 800, power line 842 and communication line 844 are wired in parallel, battery modules 810 are connected in series, and cell monitor circuits 806 are cascade-connected. In power supply device 800, since communication line 844 is wired between battery modules 810 in order to cascade-connect the plurality of cell monitor circuits 806, it is necessary to provide wiring space 845 of communication line 844 between battery modules 810. Since wiring space 845 is an adverse effect of enlarging the entire power supply device, the power supply device can be compact by narrowing wiring space 845, but a communication line wired in the narrow wiring space has an adverse effect such as being easily damaged by being sandwiched between battery modules on both sides. Since the communication line is an important communication line that transmits information on the battery cell, damage to the communication line becomes a factor that hinders reliability and safety of the power supply device. Thus, a power supply device in an environment in which a communication line is damaged cannot stably transmit a signal of battery information to an external battery control unit or the like for a long period, and has a disadvantage that reliability and safety deteriorate. In particular, a power supply device mounted on a vehicle or the like receives vibration and impact, and is used in an environment in which external conditions such as temperature and humidity are severe. Thus, it is difficult to reliably prevent the communication line from being damaged for a long period, and it is difficult to transmit important information of the battery to the outside. Thus, reliability as the power supply device is hindered from being maintained for a long period.

The present invention has been developed for the purpose of preventing the above adverse effects, and an object of the present invention is to provide a technique that can make the entire battery module compact while maintaining high reliability for a long period while cascade-connecting cell monitor circuits of a plurality of battery modules.

A power supply device according to an aspect of the present invention is a power supply device in which a plurality of battery modules including a plurality of battery cells are connected by power lines. Each of the battery modules includes a cell monitor circuit that detects battery information, a plurality of the cell monitor circuits provided in each of the battery modules are cascade-connected via communication lines. The cell monitor circuit includes a communication interface including connection parts formed by connecting the communication line, and the communication interface sets a withstand voltage applied to the connection part to become a voltage higher than an output voltage of the power supply device.

An electric vehicle according to another aspect of the present invention includes the power supply device, a motor for traveling that receives electric power from the power supply device, a vehicle body on which the power supply device and the motor are mounted, and wheels that are driven by the motor and cause the vehicle body to travel.

A power storage device according to an aspect of the present invention includes the power supply device, a power supply controller that controls charging and discharging of the power supply device. The power supply controller performs control for enabling charging of the power supply device by electric power from an outside and charging the power supply device.

The power supply device described above has an advantage that the entire power supply device can be made compact while maintaining high reliability for a long period while cascade-connecting the plurality of battery modules by the communication line.

DESCRIPTION OF EMBODIMENT

Figure 1:
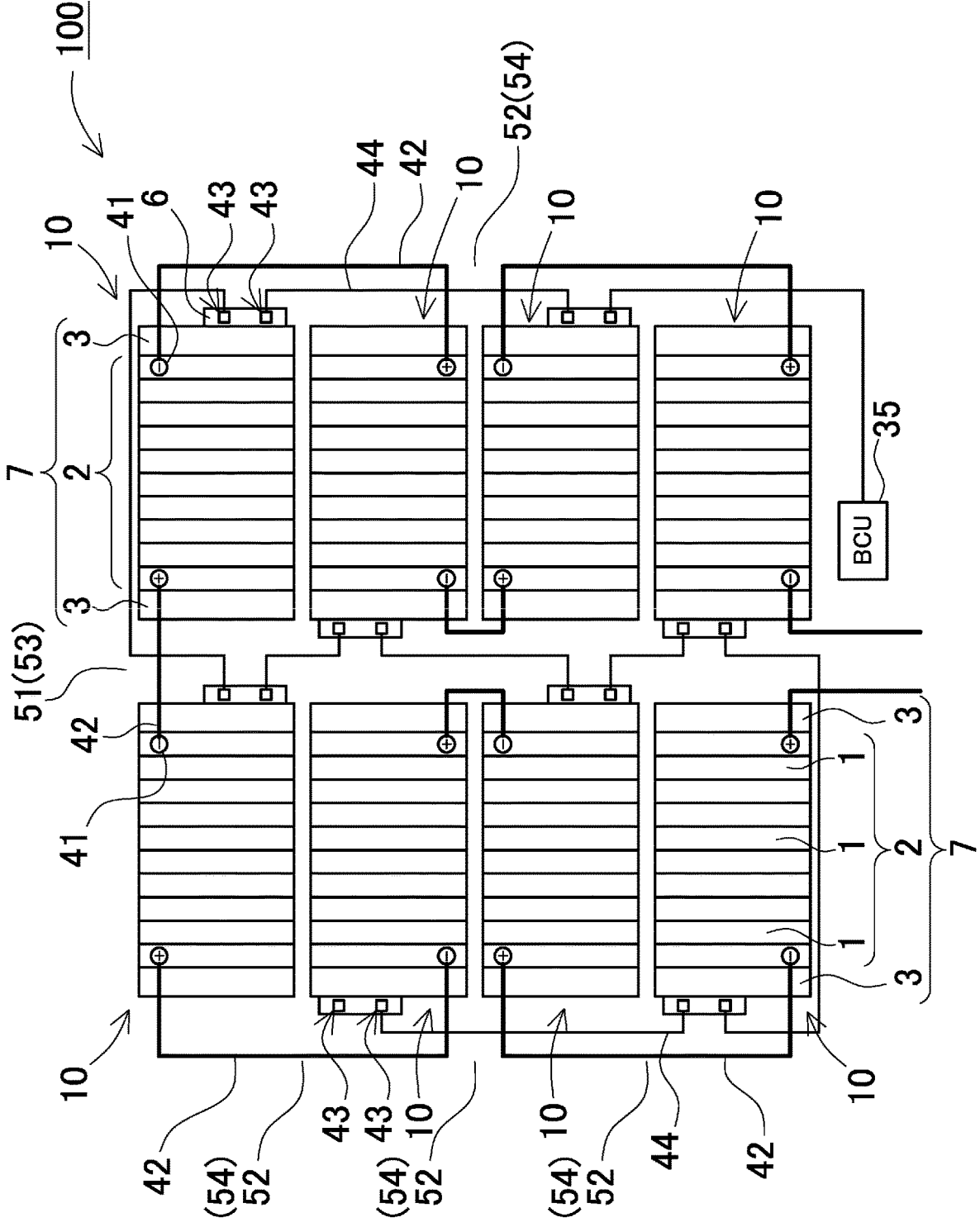
FIG. 1 is a schematic configuration diagram of a power supply device according to an exemplary embodiment of the present invention.

Hereinafter, the present invention will be described in detail with reference to the drawings. Note that, in the following description, terms (for example, "top", "bottom", and other terms including those terms) indicating specific directions or positions are used as necessary; however, the use of those terms is for facilitating the understanding of the invention with reference to the drawings, and the technical scope of the present invention is not limited by the meanings of the terms. Parts denoted by the same reference marks in a plurality of drawings indicate the same or equivalent parts or members.

Exemplary embodiments to be described below illustrates a specific example of the technical idea of the present invention, and the present invention is not limited to the exemplary embodiment below. In addition, unless otherwise specified, dimensions, materials, shapes, relative arrangements, and the like of the configuration components described below are not intended to limit the scope of the present invention only to them, but are intended to be illustrative. The contents described in one exemplary embodiment or example are also applicable to other exemplary embodiments and examples. Further, sizes, positional relationships, and the like of the members illustrated in the drawings may be exaggerated for clarifying the contents of description.

A power supply device according to a first aspect of the present invention includes a plurality of battery modules. Each battery module includes a cell monitor circuit that detects battery information such as a cell voltage, and a plurality of cell monitor circuits are cascade-connected via a communication line. The cell monitor circuit includes a communication interface including connection parts formed by connecting the communication line. The communication interface sets a withstand voltage applied to the connection part to become a voltage higher than an output voltage of the power supply device.

In the above power supply device, the battery module to which the communication line for cascade-connecting the cell monitor circuits is connected is not specified, and the communication line can be cascade-connected even though the communication line is connected to the cell monitor circuit of any battery module. Thus, the cell monitor circuits can be cascade-connected by arranging the communication line in which the conventional device is wired between the adjacent battery modules in another space. In the conventional power supply device, it is necessary to wire the power line and the communication line in parallel, in other words, to connect the communication line to the cell monitor circuits of the battery module connected by the power line. Thus, the battery module to which the communication line is connected is specified, the communication line cannot be connected to the battery module that can be optimally wired, and it is necessary to provide a space for wiring the communication line between the battery modules.

In the above power supply device, the battery module to which the communication line is connected is not specified, and the cell monitor circuits can be cascade-connected by being connected to the battery module that can optimally wire the communication line. Thus, the wiring space provided between the battery modules in the conventional battery module can be omitted, and the plurality of cell monitor circuits can be cascade-connected by the communication line. Thus, there is an advantage that the wiring space between the battery modules can be omitted and the entire battery module can be made compact.

Figure 16:
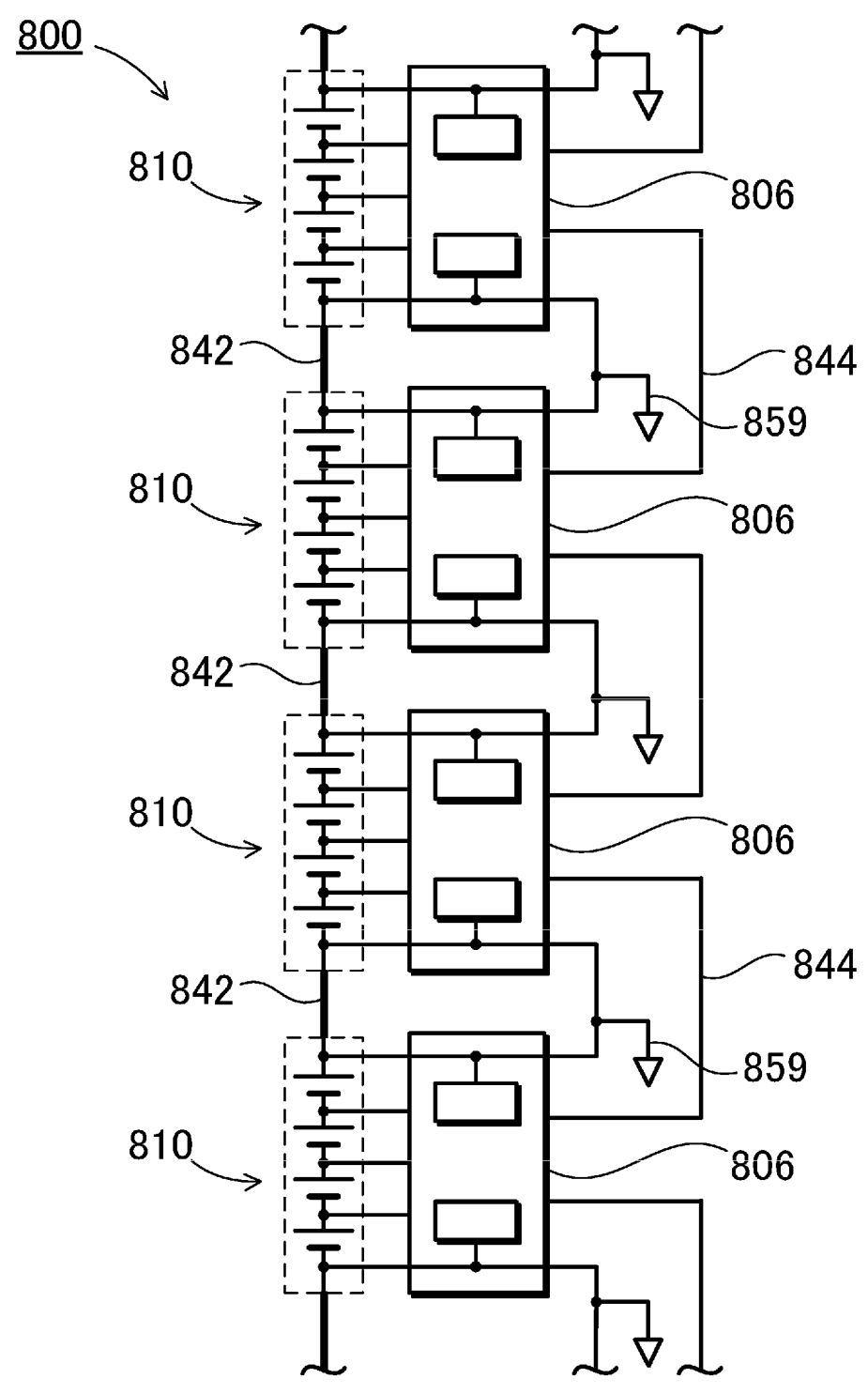
FIG. 16 is a block diagram of the power supply device illustrated in FIG. 15.

Here, FIG. 16 illustrates a block diagram of conventional power supply device 800. In power supply device 800, a plurality of battery modules 810 are connected in series by power line 842, and cell monitor circuits 806 are cascade-connected by communication line 844. As illustrated in the block diagram, in power supply device 800, cell monitor circuits 806 having common ground lines 859 connecting communication lines 844 are connected by communication line 844, and all cell monitor circuits 806 are cascade-connected. Two sets of cell monitor circuits 806 in which a plus side output and a minus side output are ground lines 859 are provided in battery module 810. In the drawing, upper and lower cell monitor circuits 806 are connected via communication line 844 such that cell monitor circuit 806 in which the pulse side output is ground line 859 and cell monitor circuit 806 in which the minus side output connected to an upper stage is ground line 859 use ground line 859 in common. The cell monitor circuits using the ground line in common can be connected by the communication line to transmit the signal such as the battery information, but the cell monitor circuit having no common ground line cannot be connected by the communication line because there is a potential difference in the ground line. Since the power supply device in FIG. 16 can be connected by the communication line only to the cell monitor circuit of the ground line without a potential difference, the cell monitor circuit to which the communication line is connected is specified. In the power supply device in which the connectable battery module is specified, the communication line cannot be arranged at an optimum position for wiring and needs to be wired at an unsuitable position, and an adverse effect such as a long wiring occurs.

In the power supply device according to the first aspect of the present invention, the battery module to which the communication line is connected is not specified, and the communication line can be arranged at an ideal position. This is because the withstand voltage of the communication interface of the cell monitor circuit is set to be higher than the output voltage of the battery module, and thus, the cell monitor circuit having a potential difference can be connected to the ground line. Since the battery module to which the communication line is connected is not limited, and it is not necessary to wire the communication line between the battery modules or the like, an advantage that the wiring space of the communication line between the battery modules can be omitted and the entire device can be made compact is realized. Since there is no need to arrange the communication line in a region that is likely to be damaged, the battery information of the battery module can be reliably transmitted to an external battery control unit or the like for a long period, and the reliability as the power supply device can be maintained high. In particular, in a severe use environment, it is possible to ensure high reliability by preventing the communication line from being damaged.

In a power supply device according to a second aspect of the present invention, the communication line includes a non-parallel communication line connected to each of the cell monitor circuits of each of the battery modules different from each of the battery modules to which the power line is connected.

The power supply device described above is connected to the battery module different from the power line, and thus, the non-parallel communication line can be wired in a free space, and the plurality of cell monitor circuits can be cascade-connected. This power supply device has an advantage that the communication line can be prevented from being damaged and reliability and safety as the device can be secured by arranging the communication line in a safe and hardly damaged space.

In a power supply device according to a third aspect of the present invention, the communication interface includes a coupling element that blocks a direct current to cause an alternating current to pass on an output side, and a withstand voltage of the coupling element is a withstand voltage higher than the output voltage of the power supply device.

The power supply device described above has an advantage that the high withstand voltage can be realized with the simple circuit configuration because the coupling element is provided to set the communication interface to have the high withstand voltage.

In a power supply device according to a fourth aspect of the present invention, the coupling element is any one of a coupling capacitor, a signal transmission transformer, and an optical transmission element.

A power supply device having a high withstand voltage of a communication interface using a coupling element as a coupling capacitor has an advantage that a high withstand voltage can be realized with an extremely inexpensive component.

The power supply device in which the coupling element is used as the signal transmission transformer and the communication interface has the high withstand voltage has an advantage that it is possible to realize the communication interface that is inexpensive and can reliably transmit the battery information with high reliability and stability for a long period.

The power supply device in which the coupling element is the optical transmission element and the communication interface has the high withstand voltage has an advantage that the communication interface capable of reliably transmitting the battery information stably for a long period without being affected by noise or the like can be realized.

In a power supply device according to a fifth aspect of the present invention, a plurality of the battery modules are arranged in multiple stages and multiple rows, vertical partitioned regions and horizontal partitioned regions are provided in a grid pattern between the battery modules adjacent to each other, any one of the vertical partitioned region and the horizontal partitioned region is a wiring space in which the communication line is wired, and the other is a non-wiring space where the communication line is not wired.

In a power supply device according to a sixth aspect of the present invention, the non-wiring space has a horizontal width narrower than a horizontal width of the wiring space.

In a power supply device according to a seventh aspect of the present invention, in the battery module, the connection part is arranged at an end facing the wiring space.

The power supply device described above has an advantage that the communication line connected to the connection part can be wired in the wiring space, the communication line can be efficiently and easily wired, and the communication line can be wired with high space efficiency.

In a power supply device according to an eighth aspect of the present invention, when each of the battery modules is a rectangular-parallelepiped extending in a stacking direction of the battery cell, both ends in the stacking direction of the battery cell are module ends, and both sides in the stacking direction are module side surfaces, the connection parts are arranged at the module ends.

In a power supply device according to a ninth aspect of the present invention, when a space facing the module ends of the battery modules adjacent to each other is a wiring space, the communication line is wired in the wiring space, and a gap facing the module side surfaces of the battery modules adjacent to each other is a non-wiring space where the communication line is not wired.

In a power supply device according to a tenth aspect of the present invention, each of the battery modules includes a battery stack stacking a plurality of battery cells, end plates arranged on both ends of the battery stack, and bind bars that are arranged on both side surfaces of the battery stack to couple the end plates, each of the battery modules is an elongated rectangular-parallelepiped in a stacking direction of battery cells, and ends in a longitudinal direction are module ends.

In a power supply device according to an eleventh aspect of the present invention, in the battery module, the cell monitor circuit is arranged on each of the end plates.

The power supply device described above has an advantage that since the communication line is connected to the cell monitor circuit arranged on the end plate, the communication line is coupled to the end plate via the cell monitor circuit and can be reliably and stably connected.

In a power supply device according to a twelfth aspect of the present invention, in the battery module, the connection part is arranged at one end.

In a power supply device according to a thirteenth aspect of the present invention, in the battery module, a pair of connection parts is arranged at one end, and the communication line is connected to the pair of connection parts.

First Exemplary Embodiment

In power supply device 100 illustrated in a schematic configuration diagram of FIG. 1, cell monitor circuits 6 of a plurality of battery modules 10 are cascade-connected by communication lines 44. In power supply device 100, adjacent battery modules 10 are connected in series by power line 42. Power lines 42 connect battery assemblies 7 of battery modules 10 in series, and communication lines 44 cascade-connect cell monitor circuits 6 of battery modules 10.

Figure 2:
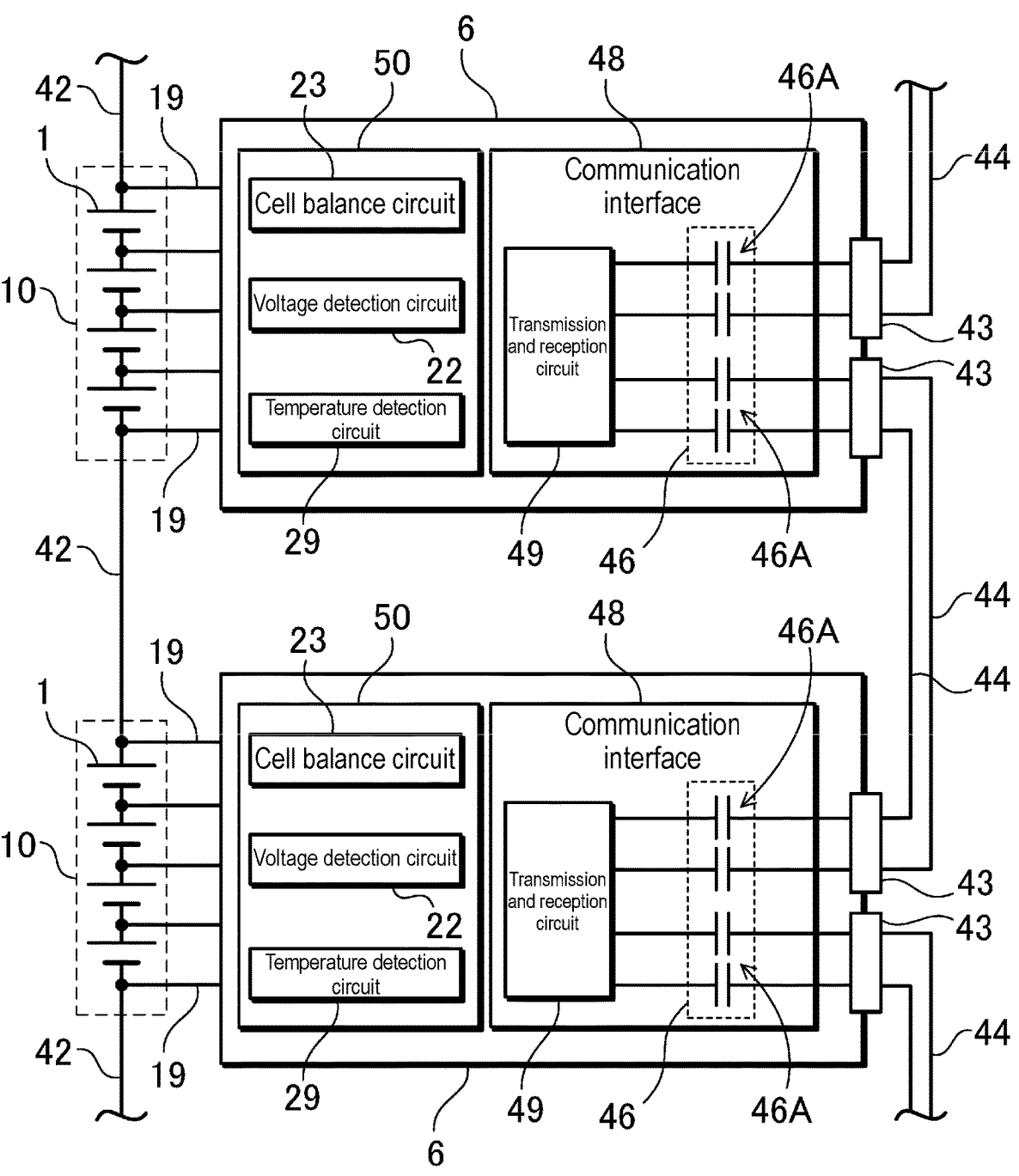
FIG. 2 is a block diagram illustrating an example of a cell monitor circuit.

FIG. 2 is a block diagram of cell monitor circuit 6. Cell monitor circuit 6 in this drawing includes communication interface 48. Communication interface 48 includes connection parts 43 that connect communication lines 44. In communication interface 48, coupling element 46 that sets a withstand voltage applied to connection part 43 to be higher than an output voltage of power supply device 100 is provided on an output side. Connection parts 43 are connected to transmission and reception circuit 49 of communication interface 48 via coupling element 46. An element that blocks a direct current and allows an alternating current to pass is preferably suitable for coupling element 46. Coupling element 46 is an element having a withstand voltage higher than the output voltage of power supply device 100. In communication interface 48 in the drawing, coupling element 46 includes coupling capacitors 46A. Coupling capacitor 46A is a capacitor having a withstand voltage higher than the output voltage of the power supply device. A ceramic capacitor excellent in durability is suitable for coupling capacitor 46A, but other capacitors such as a film capacitor can also be used. Communication interface 48 in which coupling element 46 includes coupling capacitors 46A has advantages that the component cost can be reduced and the size can be reduced. In communication interface 48 of FIG. 2, two sets of connection parts 43 for cascade-connecting cell monitor circuits 6. Connection part 43 has a pair of terminals, and each terminal is connected to transmission and reception circuit 49 via coupling capacitor 46A.

Figure 3:
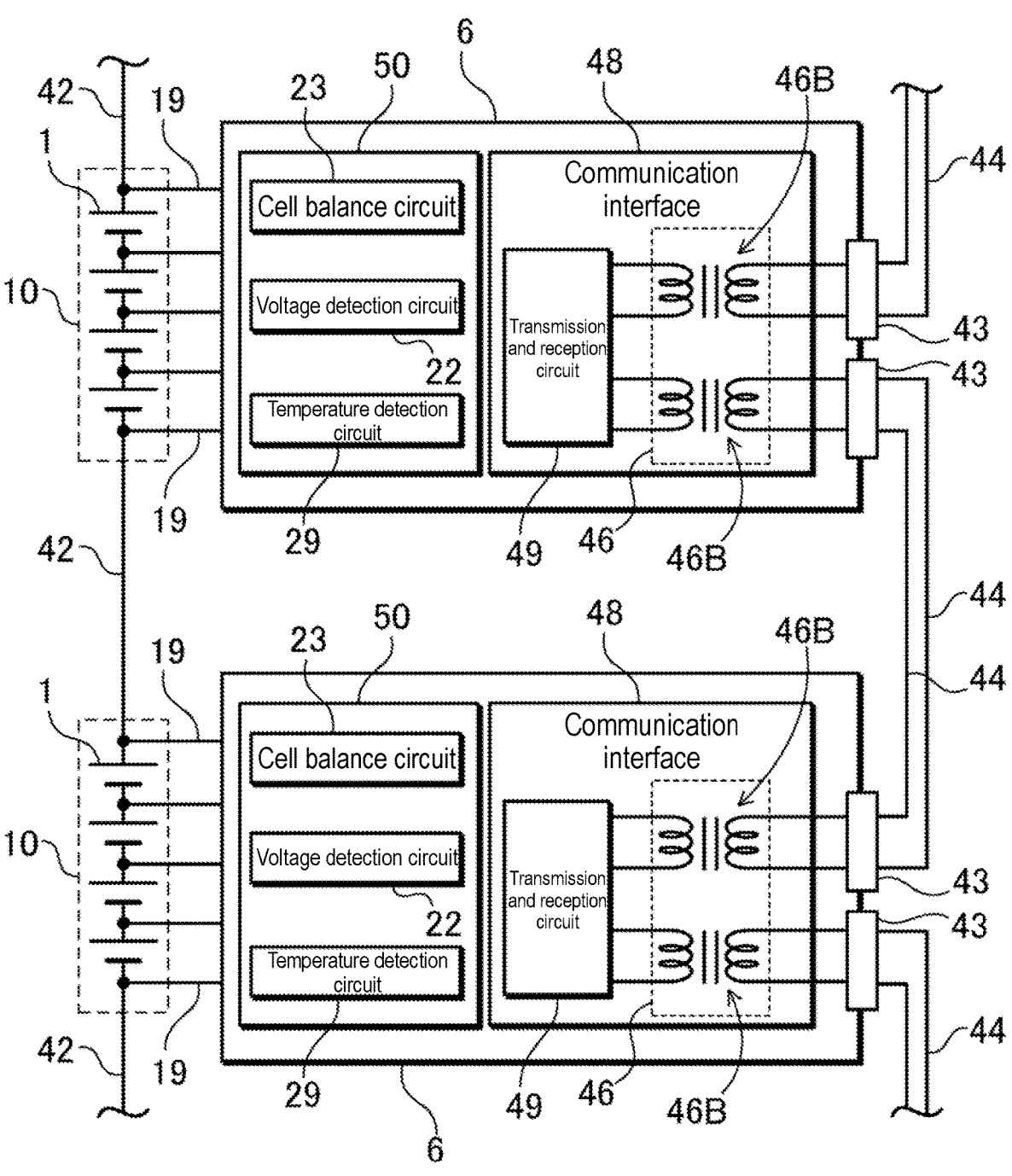
FIG. 3 is a block diagram illustrating another example of the cell monitor circuit.

In communication interface 48 of FIG. 3, coupling element 46 includes signal transmission transformers 46B. In communication interface 48, signal transmission transformers 46B are connected between transmission and reception circuit 49 and connection parts 43. Since communication interface 48 also includes two sets of connection parts 43, each connection part 43 is connected to transmission and reception circuit 49 via transformer 46B. In transformer 46B of coupling element 46, a winding on a primary side is connected to transmission and reception circuit 49, and a winding on a secondary side is connected to connection part 43.

Figure 4:
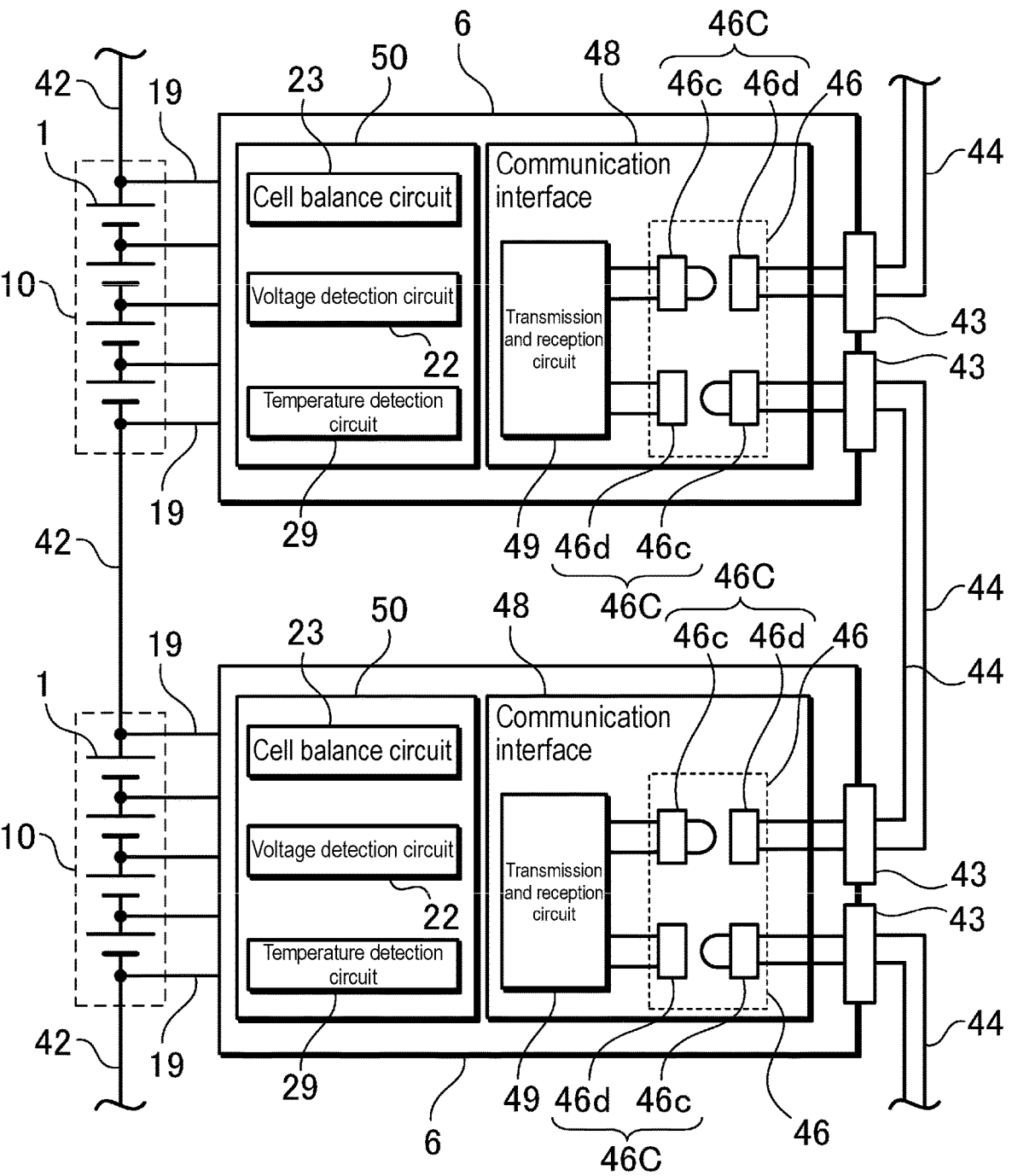
FIG. 4 is a block diagram illustrating another example of the cell monitor circuit.

In communication interface 48 of FIG. 4, coupling element 46 includes optical transmission elements 46C. In communication interface 48, optical transmission elements 46C are connected between transmission and reception circuit 49 and connection parts 43. Since communication interface 48 also includes two sets of connection parts 43, each connection part 43 is connected to transmission and reception circuit 49 via optical transmission element 46C. Optical transmission element 46C includes light source 46c that is turned on and off in response to a signal from transmission and reception circuit 49, and photoelectric transducer 46d that detects the turning on and off of light source 46c and converts the detected turning on and off into an electrical signal. In optical transmission element 46C, light source 46c and photoelectric transducer 46d are connected to transmission and reception circuit 49 and connection part 43, respectively.

Communication interface 48 in which coupling element 46 that cuts off a direct current and causes a signal component of an alternating current to pass is connected between connection part 43 and transmission and reception circuit 49 can be connected to communication interface 48 of a ground line having a potential difference through communication lines 44. This is because a direct current of the ground line is cut off by coupling element 46, and only a signal component such as battery information is transmitted. When communication interface 48 having the potential difference is connected to the ground line, since a DC voltage is applied to both ends of coupling element 46, the element having the withstand voltage higher than the output voltage of power supply device 100 is used as coupling element 46. In communication interface 48 using coupling element 46 having the high withstand voltage, since the DC component is blocked by coupling element 46, communication interface 48 connecting communication lines 44 is not specified.

Figure 5:
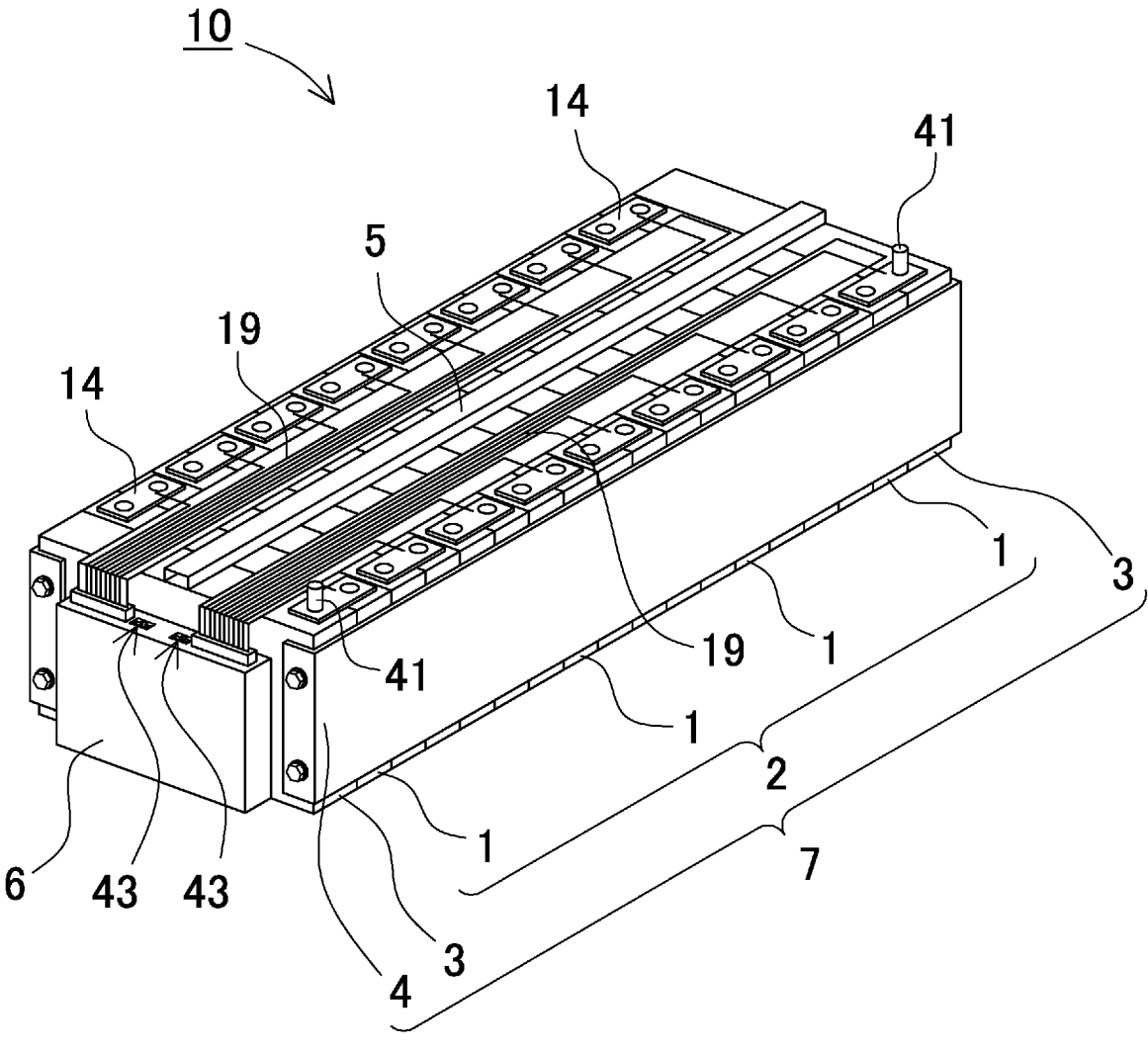
FIG. 5 is a schematic perspective view illustrating a battery module.

In battery module 10 illustrated in a schematic perspective view of FIG. 5, cell monitor circuit 6 is arranged at an end of one end plate 3 of battery assembly 7. In battery assembly 7, a pair of end plates 3 arranged at both ends of battery stack 2 in which a plurality of battery cells 1 are stacked are coupled by bind bar 4. The pair of end plates 3 coupled to bind bar 4 fix battery stack 2 in a pressurized state. As illustrated in FIG. 2, cell monitor circuit 6 includes voltage detection circuit 22 that detects voltages of battery cells 1, and communication interface 48 that outputs battery information such as the cell voltage of each battery cell 1 detected by voltage detection circuit 22 to an external battery control unit (BCU).

In order to prevent overcharge and overdischarge of battery cell 1, cell monitor circuit 6 illustrated in the block diagram of FIG. 2 includes voltage detection circuit 22 that detects the voltages of battery cells 1, cell balance circuit 23 that adjusts cell balancing between battery cells 1, temperature detection circuit 29 that detects temperatures of battery cells 1, and communication interface 48 that communicates battery information detected by these circuits. Voltage detection circuit 22 is connected to electrode terminals of battery cells 1 via voltage detection lines 19, and detects the voltages of battery cells 1. Cell balance circuit 23 performs cell balancing by equalizing a voltage difference between battery cells 1. Temperature detection circuit 29 detects the temperatures of battery cells 1. In battery module 10 of FIG. 5, cell monitor circuit 6 is arranged on an outer surface of end plate 3. Battery module 10 can prevent damage to cell monitor circuit 6 from high-temperature and high-pressure exhaust gas jetted from battery cells 1 at the time of abnormality.

Two sets of connection parts 43 for connecting communication lines 44 are provided in cell monitor circuits 6 of FIG. 1. In the battery module of FIG. 1, connection parts 43 are provided on cell monitor circuit 6, but connection parts 43 may be arranged on end plate 3. In power supply device 100 of FIG. 1, cell monitor circuits 6 provided in battery modules 10 are cascade-connected via communication lines 44, and battery information and the like are transmitted to battery control unit (BCU) 35 and the like provided outside through one line.

(Battery Assembly 7)

Battery assembly 7 includes battery stack 2 in which the plurality of battery cells 1 are stacked in a thickness, the pair of end plates 3 arranged at both ends of battery stack 2 in a stacking direction of battery cells 1, and bind bar 4 coupled to end plates 3 at both ends of battery stack 2. In battery module 10 illustrated in FIGS. 6 and 7, cell monitor circuit 6 is arranged on one end plate 3, and cell monitor circuit 6 is connected to battery cells 1 of battery stack 2 via voltage detection lines 19. Battery module 10 illustrated in the drawing includes gas duct 5 coupled to exhaust valve 1a of each battery cell 1 to exhaust the exhaust gas ejected from exhaust valve 1*a* to the outside, cover case 8 arranged above battery stack 2 and on gas duct 5, and base plate 9 arranged below the battery stack to fix end plates 3.

(Battery Cell 1)

Figure 7:
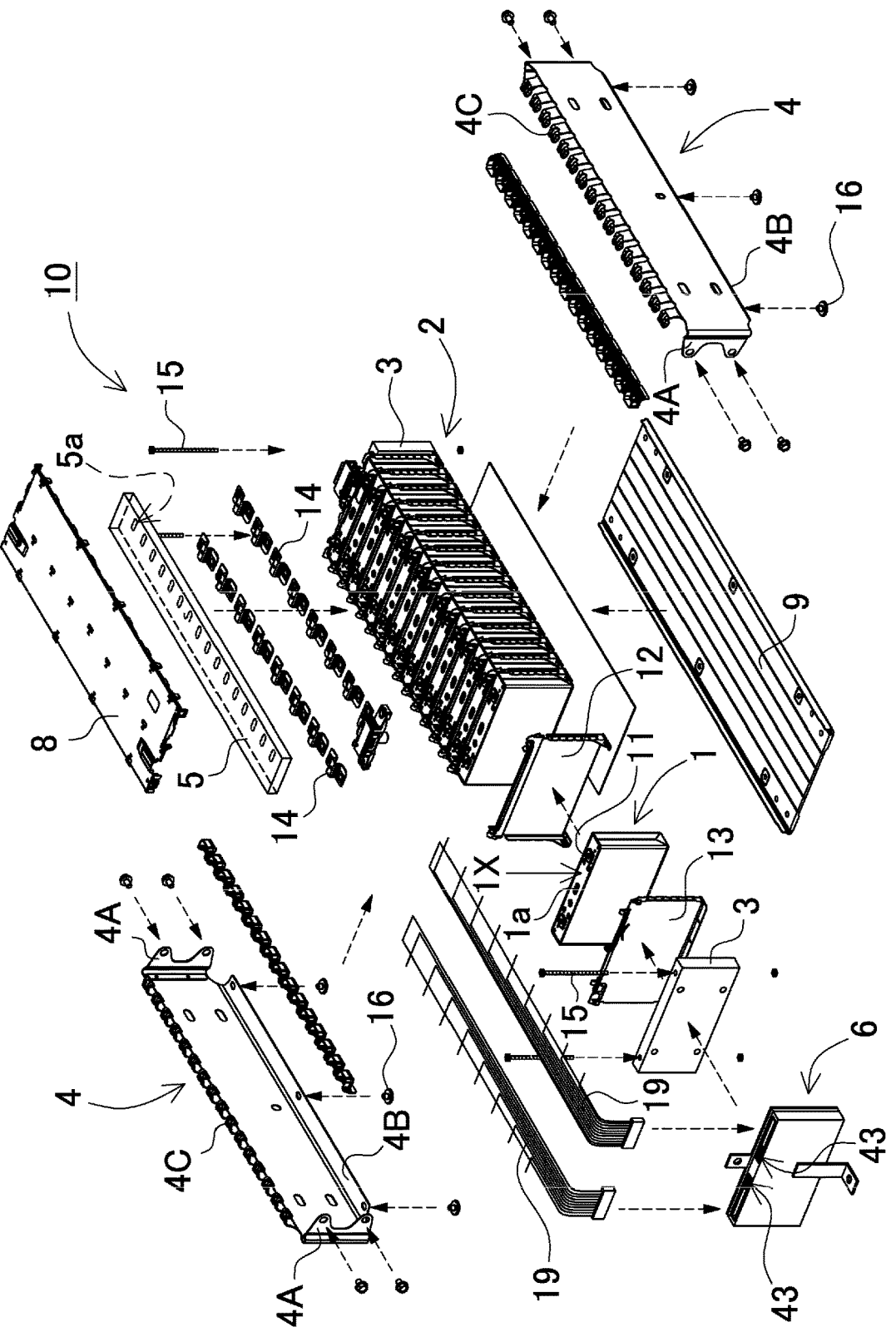
FIG. 7 is an exploded perspective view of the battery module illustrated in FIG. 6.

As illustrated in FIG. 7, battery cell 1 is a rectangular secondary battery having a width larger than a thickness, in other words, thinner than a width, and the battery cells are stacked in the thickness to form battery stack 2. Battery cell 1 is a lithium ion secondary battery. However, the battery cell may be any other chargeable secondary battery, such as a nickel hydride battery and a nickel cadmium battery. In battery cell 1, plus and minus electrode plates are housed in an exterior can having a sealed structure together with an electrolyte solution. The exterior can is formed by press-molding a metal sheet made of aluminum, an aluminum alloy, or the like into a rectangular shape, and an opening part is hermetically sealed with a sealing plate. The sealing plate is made of the aluminum or aluminum alloy same as the exterior can, and fixes plus and minus electrode terminals 11, and an exhaust valve is provided between electrode terminals 11. Plus and minus electrode terminals 11 are in a state where at least one of electrode terminals 11 is insulated from the sealing plate. Battery cell 1 is provided with plus and minus electrode terminals 11 with the sealing plate as terminal surface 1X. In battery cell 1, a bottom surface and a side surface of the exterior can are covered with an insulating film.

The plurality of battery cells 1 are stacked to allow the thickness of each battery cell 1 to be aligned with the stacking direction to constitute battery stack 2. Battery cell 1 has one outer peripheral surface of a quadrangle as terminal surface 1X provided with plus and minus electrode terminals 11. The plurality of battery cells 1 are stacked to form battery stack 2 in which terminal surfaces 1X are arranged on the same plane.

(Battery Stack 2)

As illustrated in FIG. 7, in battery stack 2, insulating spacer 12 is sandwiched between stacked battery cells 1. Insulating spacer 12 in the drawing is made of an insulating material such as resin formed into a thin plate shape or a sheet shape. Insulating spacer 12 illustrated in the drawing has a plate shape having substantially the same size as an opposing surface of battery cell 1. Insulating spacer 12 is stacked between adjacent battery cells 1 and insulates adjacent battery cells 1 from each other. As the spacer arranged between adjacent battery cells 1, a spacer having a shape in which a flow path of a cooling gas is formed between the battery cell and the spacer may also be used.

In battery stack 2, bus bars 14 made of metal are connected to plus and minus electrode terminals 11 of adjacent battery cells 1. The plurality of battery cells 1 are connected in series or in parallel or in series and in parallel by bus bars 14. In battery stack 2, the output voltage and the chargeable and dischargeable capacity are set as set values by the number of battery cells 1 to be stacked. Battery stack 2 is capable of increasing the output voltage by the number of battery cells 1 connected in series and increasing the charge and discharge capacity by the number of battery cells 1. In battery module 10, the output voltage and the capacity are set as set values by the number of battery cells 1 constituting battery stack 2 and the connection state of connecting in series and in parallel. Therefore, the number of battery cells 1 and the connection state are in an optimal state in consideration of the application.

Bus bar 14 is provided with a connection part (not illustrated) for connection to electrode terminal 11. Bus bar

14 is welded and connected to electrode terminal 11 by irradiating a boundary connecting the connection part and electrode terminal 11 with a laser beam. The bus bar may be coupled to the electrode terminal by providing a male screw in the electrode terminal, opening a through-hole for inserting the electrode terminal, and screwing a nut into the male screw of the electrode terminal inserted in the through-hole, or may be coupled to the electrode terminal by providing a female screw hole in the electrode terminal, and screwing a set screw penetrating the bus bar into the female screw hole. In battery module 10, an upper surface of battery stack 2 can be provided with a resin insulating cover (not illustrated). The insulating cover is provided with an opening part, electrode terminal 11 is exposed from this opening part, bus bar 14 of a metal sheet is connected to electrode terminal 11 exposed from the opening part of the insulating cover on the upper surface side of the insulating cover, and the plurality of battery cells 1 can be connected in a predetermined array.

(End Surface Spacer 13)

In battery stack 2, end plates 3 can be arranged on both end surfaces with end surface spacers 13 interposed therebetween in order to insulate the battery stack from end plates 3 made of metal. End surface spacers 13 are arranged between battery stack 2 and end plates 3 to insulate end plates 3 from battery stack 2. Each end surface spacer 13 is made of an insulating material such as resin and formed into a thin plate shape or a sheet shape. End surface spacer 13 is provided with a plate part having a size capable of covering the entire opposing surface of battery cell 1, and this plate part is stacked between battery cell 1 and end plates 3 arranged at both ends of battery stack 2.

(End Plate 3)

End plates 3 are provided on both end surfaces of battery stack 2 in the stacking direction of battery cells 1, and fix battery stack 2. End plate 3 is a metal sheet and is a quadrangular plate whose outer shape is substantially equal to the outer shape of battery cell 1 or slightly larger than battery cell 1. End plate 3 can be made of a high-tensile strength steel to have a tough structure. End plate 3 may be a single metal sheet, may have a structure in which a plurality of metal sheets are stacked, or may be a stack of a metal sheet and plastic. End plate 3 made of one metal sheet has a large heat capacity, and can efficiently absorb heat energy of cell monitor circuit 6. In end plate 3 on which a plurality of sheets are stacked, a surface side to which cell monitor circuit 6 is fixed is at least a metal sheet. This is because cell monitor circuit 6 is fixed in a thermally coupled state and improves heat dissipation characteristics. The end plate is configured to be a stacked structure of an aluminum plate and a high-tensile steel plate. This end plate may also have a structure in which cell monitor circuit 6 is fixed with the surface side as an aluminum plate, the aluminum plate and the high-tensile steel plate are stacked in a surface contact state and heat may be efficiently conducted from the aluminum plate to the high-tensile steel plate. However, the end plate is not necessarily made of metal, and may be made of plastic having excellent strength, such as engineering plastic.

(Bind Bar 4)

Figure 6:
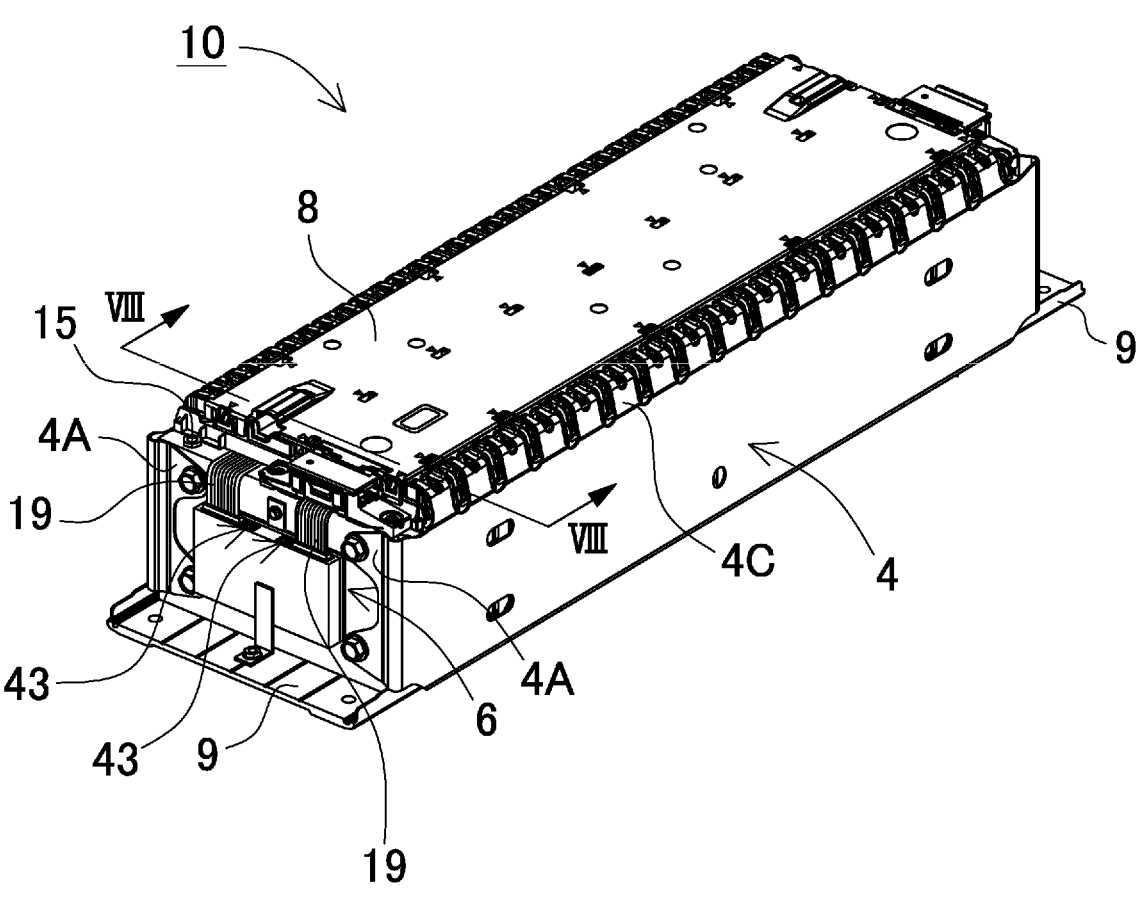
FIG. 6 is a perspective view of the battery module.

Bind bar 4 extends in the stacking direction of battery cells 1, fixes both ends to end plate 3, and fixes battery stack 2 with the pair of end plates 3. Each bind bar 4 illustrated in FIGS. 6 and 7 is a metal sheet having a predetermined vertical width along a side surface of battery stack 2 and a predetermined thickness. The bind bars are arranged so as to oppose both side surfaces of battery stack 2. Bind bars 4 pressurize both end surfaces of battery stack 2 with a strong pressure, and dispose battery cells 1 about to swell by charging and discharging at a fixed position. As the metal sheet of bind bar 4, a high-tensile strength steel is preferably used. Bind bar 4 made of a metal sheet is formed into a predetermined shape by press-molding.

As illustrated in an exploded perspective view in FIG. 7, in order to fix both ends of bind bar 4 to the pair of end plates 3, fixing parts 4A bent along an outer surface of end plate 3 are provided at both ends of the bind bar in the stacking direction of battery stack 2. Bind bar 4 fastens the pair of end plates 3 by, for example, screwing fixing parts 4A to end plates 3.

Figure 8:
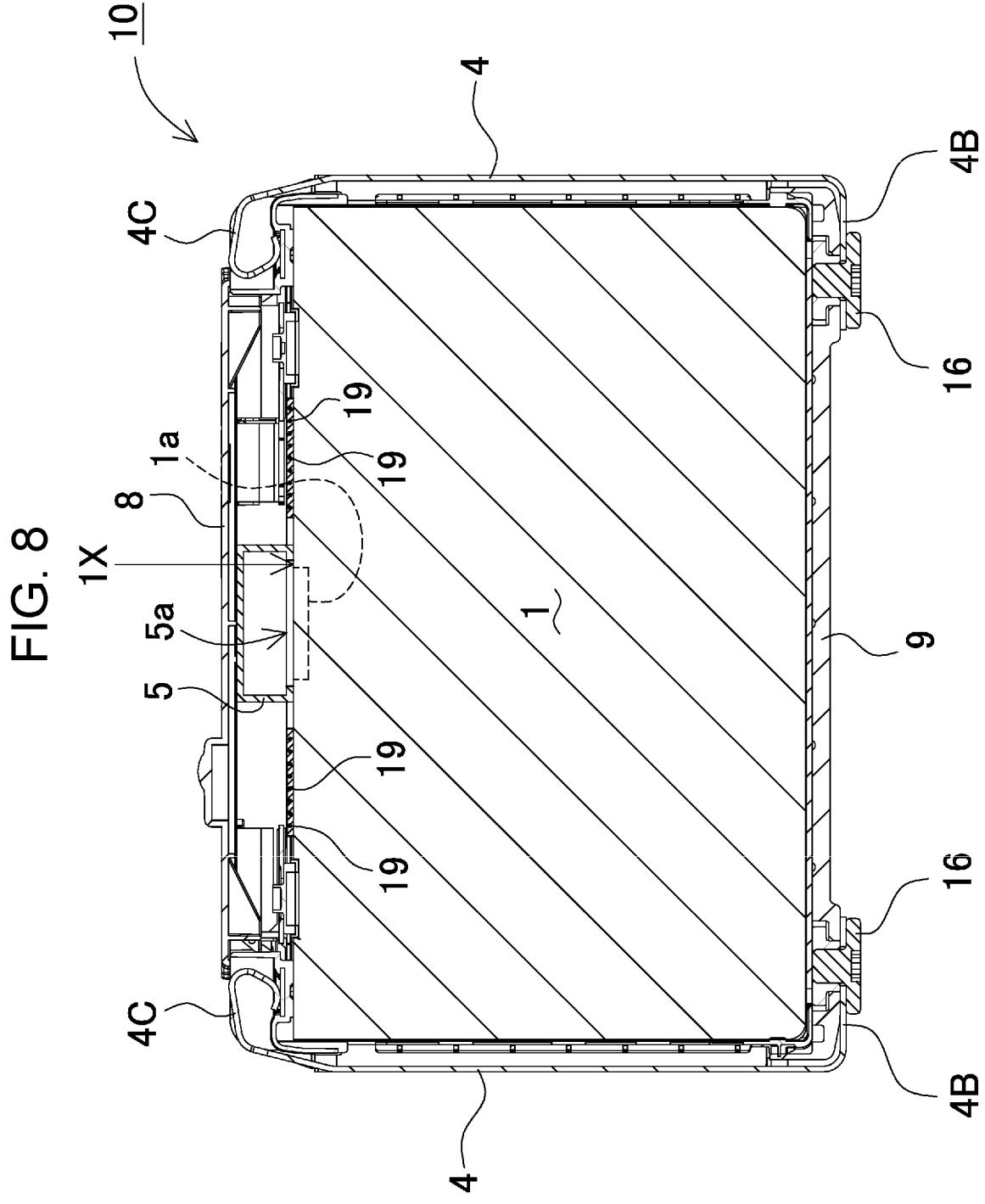
FIG. 8 is a cross-sectional view taken along line VIII-VIII of the battery module illustrated in FIG. 6.

As illustrated in FIGS. 7 and 8, a lower end of bind bar 4 is bent into an L shape to form lower coupling piece 4B. Lower coupling piece 4B is stacked on lower surface sides of both side parts of base plate 9 and coupled to base plate 9. Bind bar 4 is bent at an upper end to form pressing pieces 4C that press an end of the upper surface of battery stack 2. Pressing pieces 4C are separated for each battery cell 1 so as to individually press upper surfaces of battery cells 1 of battery stack 2. This allows each pressing piece 4C to press battery cell 1 toward base plate 9 independently of adjacent pressing pieces 4C. In this way, each battery cell 1 is blocked from floating from base plate 9 and held in a height, and even though vibration, impact, and the like are applied to battery stack 2, each battery cell 1 can be maintained so as not to be displaced in an up-down direction. In this manner, bind bars 4 cover and hold corners of upper and lower surfaces of battery stack 2 on both left and right sides of battery stack 2.

As for the shape of bind bar 4 and the structure for fastening with end plates 3, known structures can be appropriately used. For example, both ends of the bind bar may be formed into a flat plate shape without being bent into an L shape and may be screwed with a side surface of the end plate. Alternatively, a part where the bind bar opposes the side surface of the end plate may have an engagement structure to be engaged in a stepped manner, and the bind bar may be further screwed in a state of being locked to the side surface of the end plate with a locking structure.

An insulating sheet may be interposed between bind bar 4 and battery stack 2. The insulating sheet is made of a material having an insulating property such as resin and provides insulation between bind bar 4 made of metal and battery cells 1.

(Base Plate 9)

As illustrated in FIGS. 7 and 8, base plate 9 is arranged on bottom surfaces of battery stack 2 and end plate 3. End plate 3 is fixed to base plate 9, and more preferably, the lower end of bind bar 4 is also fixed to the base plate. End plate 3 and bind bar 4 are fixed to base plate 9 via fixing screws 15, 16. Fixing screw 15 for fixing end plate 3 penetrates end plate 3 in the up-down direction and fixes end plate 3 to base plate 9. Fixing screw 16 for fixing bind bar 4 also penetrates lower coupling piece 4B, which is a lower end of bind bar 4, and is fixed to base plate 9.

In battery stack 2, each battery cell 1 is arranged in a thermally coupled state with base plate 9 in contact with base plate 9. Battery cell 1 thermally coupled to base plate 9 dissipates heat energy to base plate 9. Base plate 9 may be forcibly cooled to further efficiently dissipate heat energy of battery cell 1. Although not illustrated, base plate 9 to be forcibly cooled can be forcibly cooled by circulating a refrigerant or a coolant inside of the base plate. The base plate may also be forcibly cooled by providing a heat dissipation fin on the lower surface. The base plate may also be forcibly cooled by cooling plates stacked in a surface contact state on the lower surface of the base plate. The cooling plate can be forcibly cooled by circulating a refrigerant or a coolant inside of the cooling plate.

(Gas Duct 5)

As illustrated in FIGS. 5 to 8, gas duct 5 is arranged on an upper surface of battery cell 1, that is, at a position opposing terminal surface 1X of battery cell 1. Gas duct 5 has a cylindrical shape with an inner capacity for smoothly discharging a material discharged from the opening part of exhaust valve 1a, opens at a lower surface, and is coupled to the opening part of exhaust valve 1a of each battery cell 1. Gas duct 5 in FIG. 8 has a rectangular cylindrical shape having a cross-sectional shape as a rectangular shape having a wide width. Gas duct 5 is arranged in close contact with the upper surface of battery stack 2 so as not to form a gap with terminal surface 1X of battery cell 1 so as to discharge the exhaust gas discharged from exhaust valve 1a to the outside, and opening part 5a opening on the lower surface is coupled to exhaust valve 1a of each battery cell 1. Gas duct 5 may be arranged so as not to leak the exhaust gas by arranging a packing or sealing material or the like between the gas duct and terminal surface 1X.

Although not illustrated, the gas duct may be configured by a collective duct arranged on the upper surface of the battery stack in a posture extending in the stacking direction of the battery cells, and a branch duct coupled to the collective duct and having a tip end coupled to the exhaust valve. In this gas duct, the collective duct can be arranged away from the terminal surface, and the tip end of the branch duct can be coupled to the opening part of the exhaust valve.

(Cell Monitor Circuit 6)

Cell monitor circuit 6 includes battery information detection circuit 50 that detects battery information of battery cells 1 constituting battery stack 2, and communication interface 48 of a signal indicating the battery information detected by detection circuit 50. In cell monitor circuit 6 illustrated in the block diagram of FIG. 2, detection circuit 50 includes voltage detection circuit 22 that detects the voltages of battery cells 1, cell balance circuit 23, and temperature detection circuit 29. Voltage detection circuit 22 of cell monitor circuit 6 is connected to each battery cell 1 through voltage detection line 19, and detects the voltage of battery cell 1.

Voltage detection circuit 22 preferably detects the voltages of all battery cells 1. However, it is possible for voltage detection circuit 22 not to necessarily detect the voltages of all battery cells 1 but to, for example, divide battery cells 1 constituting battery stack 2 into a plurality of battery units and detect a voltage of each battery unit. The battery unit in which the plurality of battery cells 1 are connected in parallel can detect the voltage of the battery unit and detect the voltages of all the battery cells. The battery unit in which the plurality of battery cells are connected in series detects the voltage of the battery unit and detects a total voltage of the cascade-connected battery cells. The battery unit in which the plurality of battery cells are cascade-connected includes 2 to 5 battery cells. Since this battery unit detects the voltage of the battery unit and detects the total voltage of the 2 to 5 battery cells 1, the voltages of the battery cells become ½ to ⅕ of the total voltage to be detected. The voltage of battery cell 1 changes depending on the remaining capacity. The voltage of battery cell 1 becomes higher than a preset maximum voltage when overcharged, and becomes lower than a minimum voltage when overdischarged. When battery cell 1 is overcharged or overdischarged, electrical characteristics are degraded and the safety also deteriorates. Voltage detection circuit 22 detects the voltage of battery cell 1 and transmits the voltage to a controlling circuit (not illustrated), and the controlling circuit controls a charge and discharge current such that the voltage of battery cell 1 falls within a set range.

As battery module 10 repeats charging and discharging, the remaining capacity or the voltage of each battery cell 1 becomes imbalanced. Battery cells 1 connected in series are charged and discharged with the same current. Battery cells 1 are charged and discharged at the same current, but the electrical characteristics of battery cells 1 are not completely the same. Therefore, in battery module 10 in which the plurality of battery cells 1 are connected in series, the voltage or the remaining capacity of each battery cell 1 becomes imbalanced as the charging and discharging are repeated. The imbalance of battery cells 1 causes overcharge or overdischarge of specific battery cell 1. Since battery module 10 simultaneously charges and discharges all battery cells 1, the imbalance of battery cells 1 causes overcharge or overdischarge of specific battery cell 1. The overcharge and overdischarge of battery cell 1 deteriorate the electrical characteristics of battery cell 1, cause degradation, and degrade safety of battery module 10. Cell balance circuit 23 that eliminates the voltage imbalance of battery cells 1 is provided, and power supply device 100 can equalize the battery cells.

Cell monitor circuit 6 of FIG. 2 includes cell balance circuit 23. Cell monitor circuit 6 discharges a battery having a high voltage and charges a battery having a low voltage by using voltage detection lines 19 of voltage detection circuit 22. Thus, the voltages of battery cells 1 can be equalized to eliminate the imbalance. Cell balance circuit 23 can equalize the remaining capacity by discharging a high-voltage battery cell having a large remaining capacity.

Figure 9:
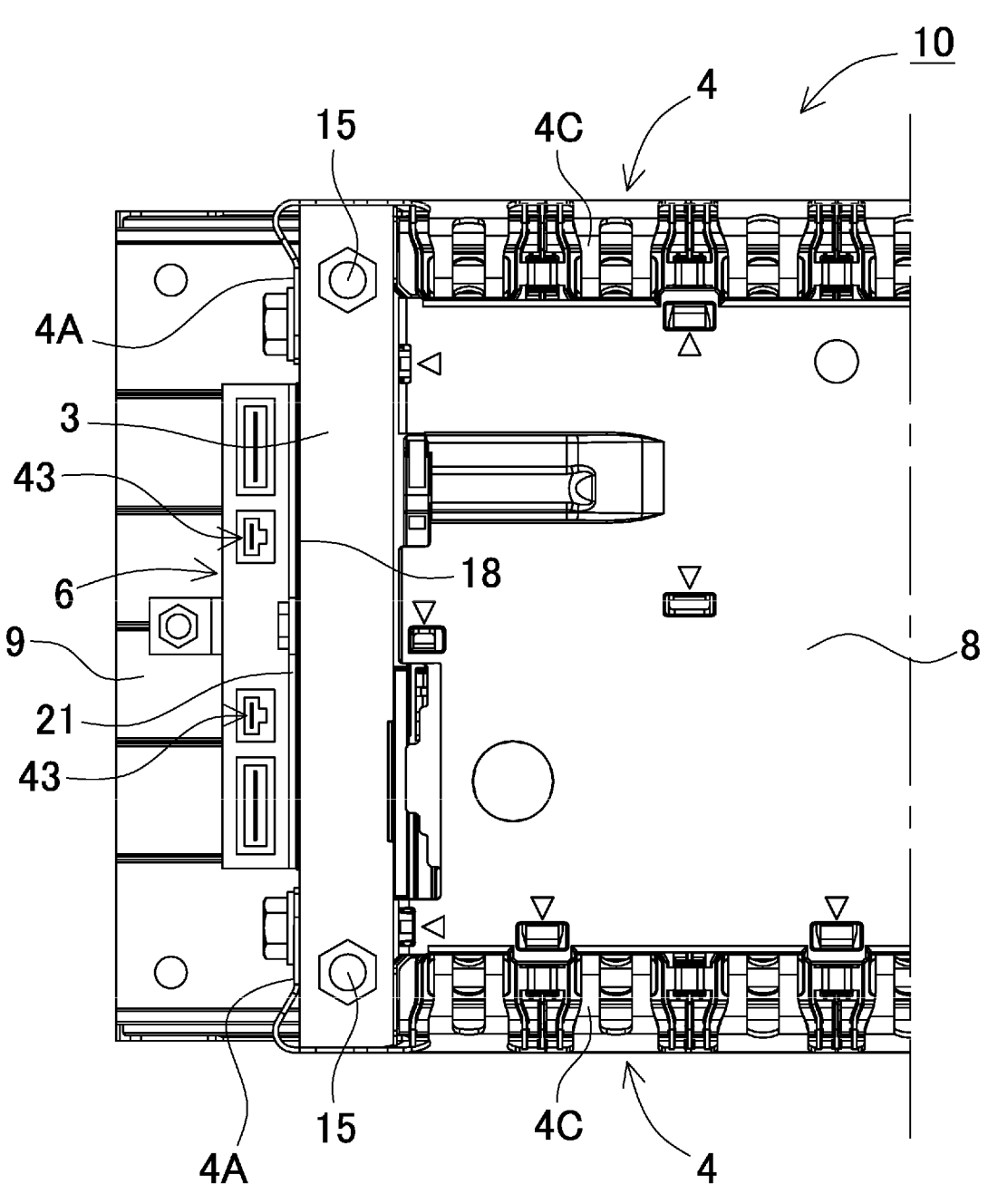
FIG. 9 is a plan view illustrating an end of the battery module illustrated in FIG. 6.

Cell monitor circuit 6 is preferably fixed to end plate 3 in an insulated manner. As illustrated in FIG. 9, cell monitor circuit 6 is fixed by arranging insulating sheet 18 between the cell monitor circuit and end plate 3. As an elastic sheet made of a rubber-like elastic body, insulating sheet 18 can constantly hold curved end plate 3 and cell monitor circuit 6 in a thermally coupled state. While cell monitor circuit 6 fixed to end plate 3 in an insulated manner has a structure in which radiator 21 made of metal and the like are exposed to the surface and can efficiently dissipate heat, the cell monitor circuit can improve insulation characteristics with respect to battery stack 2 arranged inside end plate 3, and thus, reliability can be raised. Battery module 10 in which end plates 3 are arranged on both end surfaces of battery stack 2 can prevent electric shock and electric leakage by insulating end plates 3 from a ground line. High-voltage battery stack 2 is arranged inside end plate 3 insulated from the ground line. End plate 3 insulated from battery stack 2 maintains high electric leakage resistance with battery stack 2, but the electric leakage resistance may decrease due to various factors. For example, dew condensation water between end plate 3 and battery stack 2 causes a decrease in electric leakage resistance. Cell monitor circuit 6 arranged in an insulated manner from end plate 3 is insulated from end plate 3 even when contact resistance between end plate 3 and battery stack 2 is lowered, and adverse effects such as electric leakage and electric shock are prevented to ensure high safety and reliability. However, since the end plate is insulated from the battery stack, the end plate can be connected to the ground line.

In battery module 10 described above, since a heat generating component of cell balance circuit 23 of cell monitor circuit 6 can be efficiently dissipated by end plate 3, battery cells 1 can be quickly equalized by cell balance circuit 23. This is because the power consumption of cell balance circuit 23 is increased to discharge battery cell 1 with a large current, and the voltage of high-voltage battery cell 1 can be rapidly reduced. Cell balance circuit 23 discharges high-voltage battery cell 1 to eliminate voltage imbalance or charges low-voltage battery cell 1 with high-voltage battery cell 1. Thus, the battery cells are equalized. The circuit that discharges and equalizes high-voltage battery cell 1 discharges high-voltage battery cell 1 with a discharge resistor, and cell balance circuit 23 that charges low-voltage battery cell 1 with high-voltage battery cell 1 supplies electric power from high-voltage battery cell 1 to low-voltage battery cell 1. Thus, the battery cells are equalized. In the circuit that discharges and equalizes battery cell 1 by a discharge resistor, the discharge resistor that discharges battery cell 1 and a semiconductor element that is a switching element that controls a discharge current of the discharge resistor generate heat. This circuit has a structure for efficiently discharging the heat energy of the discharge resistor and the semiconductor element, and can shorten a time for equalizing by increasing the discharge current of the discharge resistor and the semiconductor element. When the discharge current is increased, a heat generation amount is also increased. Therefore, efficient discharge can increase the discharge current. In cell balance circuit 23 that charges the low-voltage battery cell with the high-voltage battery cell, the semiconductor element that controls the current to be charged from the high-voltage battery cell to the low-voltage battery cell generates heat, and therefore the time for equalization can be shorten by increasing the current of this semiconductor element.

(Power Line 42)

Power line 42 can be effectively used as a power source of an electric vehicle such as a hybrid vehicle or an electric car and also as a power storage device by connecting the plurality of battery modules 10 in series to increase the output voltage. In power supply device 100 of FIG. 1, adjacent battery modules 10 are connected in series by power line 42, and cell monitor circuits 6 of battery modules 10 are cascade-connected by communication line 44.

In power supply device 100 of FIG. 1, power line 42 and communication line 44 are not connected in parallel, and non-parallel communication line 44 is connected to cell monitor circuit 6 of battery module 10 different from battery module 10 connected by power line 42. Non-parallel communication line 44 cascade-connects cell monitor circuit 6 of battery module 10 having a potential difference to the ground line.

In power supply device 100 of FIG. 1, the plurality of battery modules 10 are arranged in multiple stages and multiple rows, and vertical partitioned regions 51 and horizontal partitioned regions 52 are provided in a grid pattern between adjacent battery modules 10. In power supply device 100 in this drawing, vertical partitioned region 51 is wiring space 53 in which communication line 44 is wired, and horizontal partitioned region 52 is non-wiring space 54 in which communication line 44 is not wired. Horizontal partitioned region 52 of non-wiring space 54 is narrower than vertical partitioned region 51 to narrow a gap between battery modules 10. In power supply device 100, cell monitor circuit 6 is arranged at an end facing wiring space 53, and communication line 44 connected to connection part 43 of cell monitor circuit 6 is arranged in wiring space 53. In power supply device 100 of FIG. 1, battery module 10 is a rectangular-parallelepiped extending in the stacking direction of battery cells 1, both ends in the stacking direction of battery cells 1 are module ends, and both sides in the stacking direction are module side surfaces. Cell monitor circuit 6 is provided on end plate 3, and connection part 43 of cell monitor circuit 6 is arranged at the module end. In power supply device 100, a space where module ends of adjacent battery modules 10 face each other is set as wiring space 53, communication line 44 is wired in wiring space 53, and a gap where module side surfaces of adjacent battery modules 10 face each other is set as non-wiring space 54 where communication line 44 is not wired.

Figure 10:
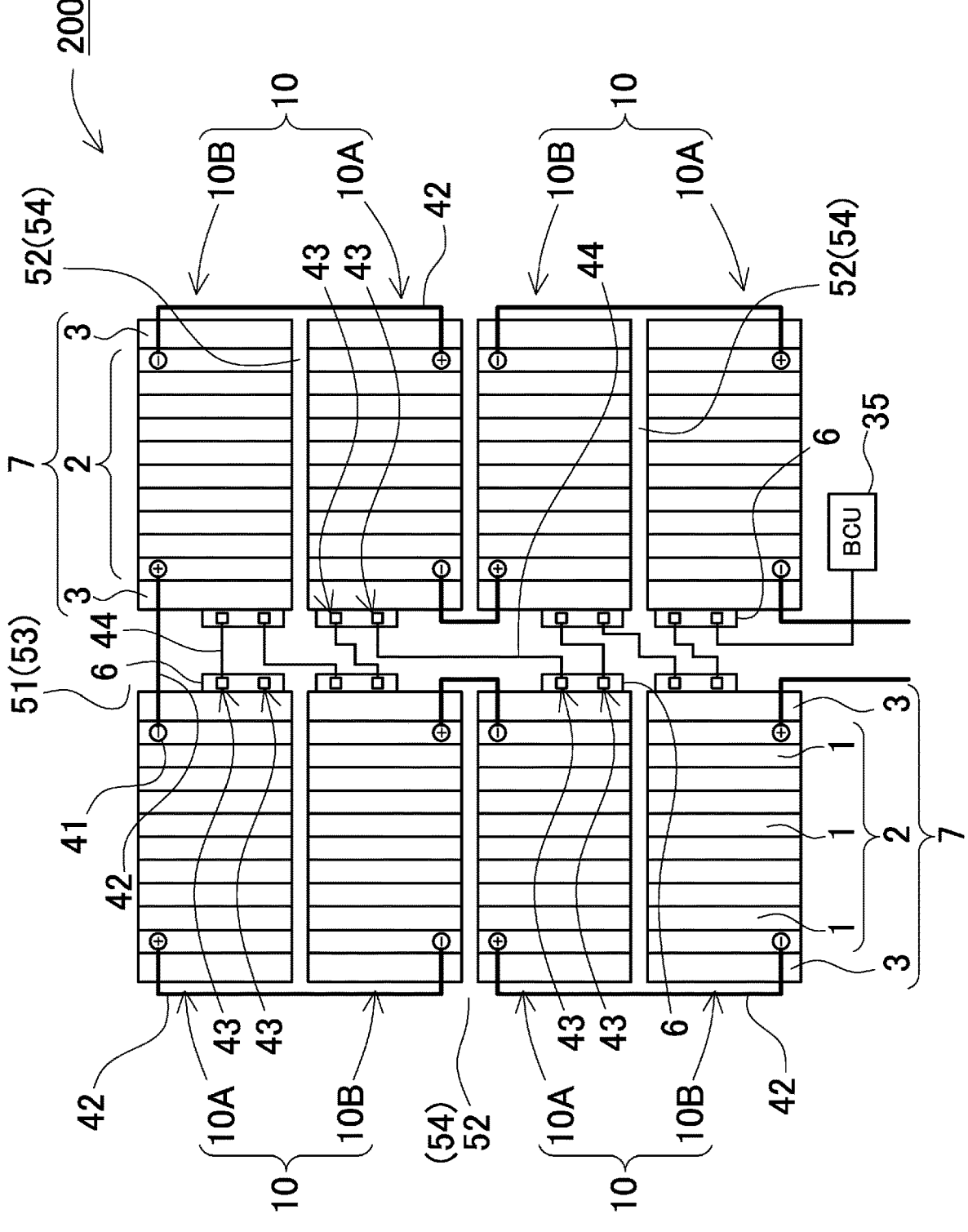
FIG. 10 is a schematic configuration diagram of a power supply device according to another exemplary embodiment of the present invention.

In power supply device 200 of FIG. 10, vertical partitioned region 51 is a wiring space where communication line 44 is wired, all communication lines 44 are wired only in vertical partitioned region 51, and horizontal partitioned region 52 is non-wiring space 54 where communication line 44 is not wired. Horizontal partitioned region 52 of non-wiring space 54 is narrower than vertical partitioned region 51, and a gap between battery modules 10 is narrower. In power supply device 200, all cell monitor circuits 6 are arranged at ends facing wiring space 53, and communication line 44 connected to connection part 43 of cell monitor circuit 6 is arranged in the wiring space.

Power supply device 200 is realized by arranging, among plus and minus output terminals 41 provided in battery assembly 7, alternately arranging battery module 10A in which cell monitor circuit 6 is arranged at the module end where minus output terminal 41 is provided and battery module 10B in which cell monitor circuit 6 is arranged at the module end where plus output terminal 41 is provided in a posture parallel to each other and arranging the module end at which cell monitor circuit 6 is arranged near vertical partitioned region 51. In power supply device 200, since communication line 44 can be arranged in a concentrated manner in vertical partitioned region 51 at a central portion, communication line 44 can be further wired in a space-saving manner to effectively prevent communication line 44 from being damaged, and a total length of communication line 44 can be shortened to reduce adverse effects such as noise.

The power supply device described above can be used as a power source for a vehicle where electric power is supplied to a motor used for causing an electric vehicle to travel. As an electric vehicle on which the power supply device is mounted, an electric vehicle such as a hybrid car or a plug-in hybrid car that travels by both an engine and a motor, or an electric car such as an electric car that travels only by a motor can be used, and the power supply device is used as a power source for these vehicles. In order to provide electric power that drives the vehicle, it is preferable that a large-capacity, high-output power supply device is mounted and includes a plurality of the above-described battery modules that are connected in series or parallel and a controlling circuit that is a necessary addition.

(Battery Device for Hybrid Car)

Figure 11:
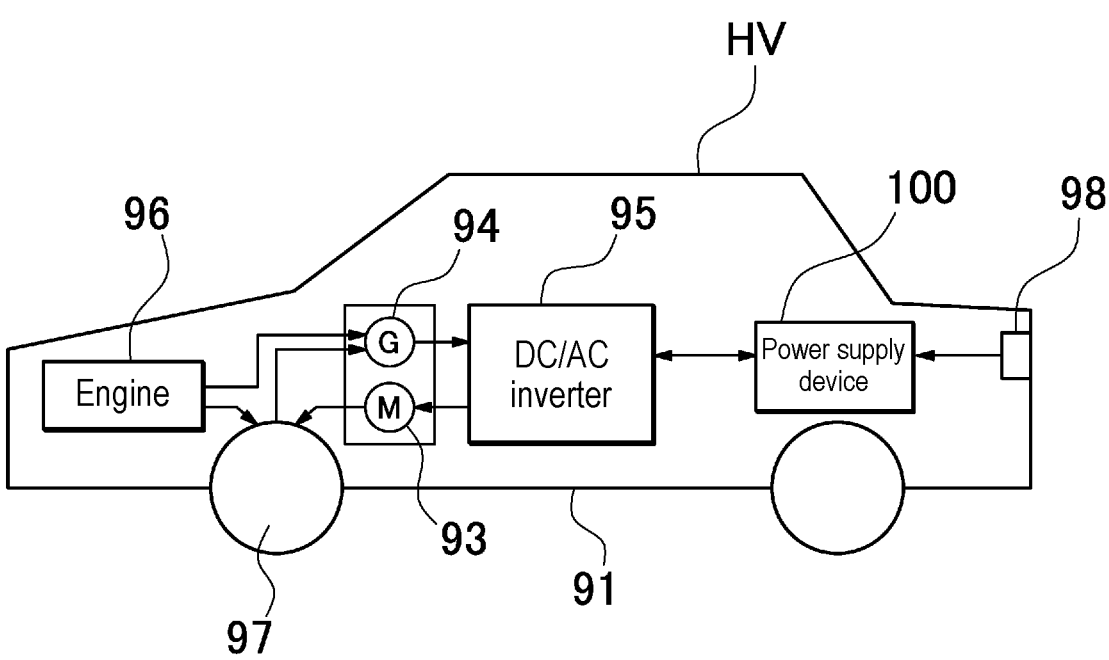
FIG. 11 is a block diagram illustrating an example in which the battery module is mounted on a hybrid car that travels by an engine and a motor.

FIG. 11 illustrates an example in which the power supply device is mounted on the hybrid car that travels by both the engine and the motor. Vehicle HV illustrated in the drawing on which the power supply device is mounted includes: vehicle body 91; engine 96 and motor 93 for traveling that causes vehicle body 91 to travel; wheels 97 that are driven by engine 96 and motor 93 for traveling; power supply device 100 that supplies electric power to motor 93; and power generator 94 that charges a battery of power supply device 100. Power supply device 100 is connected to motor 93 and power generator 94 via DC/AC inverter 95. Vehicle HV travels using both motor 93 and engine 96 while charging and discharging the battery of power supply device 100. Motor 93 is driven in a region where an engine efficiency is low, for example, during acceleration or low-speed traveling, and causes the vehicle to travel. Motor 93 is driven by electric power supplied from power supply device 100. Power generator 94 is driven by engine 96 or driven by regenerative braking acquired when braking is applied to a vehicle, and charges the battery of power supply device 100. As illustrated in the drawing, vehicle HV may include charging plug 98 to charge power supply device 100. Connecting charging plug 98 to an external power source enables charging of power supply device 100.

(Power Supply Device for Electric Car)

Figure 12:
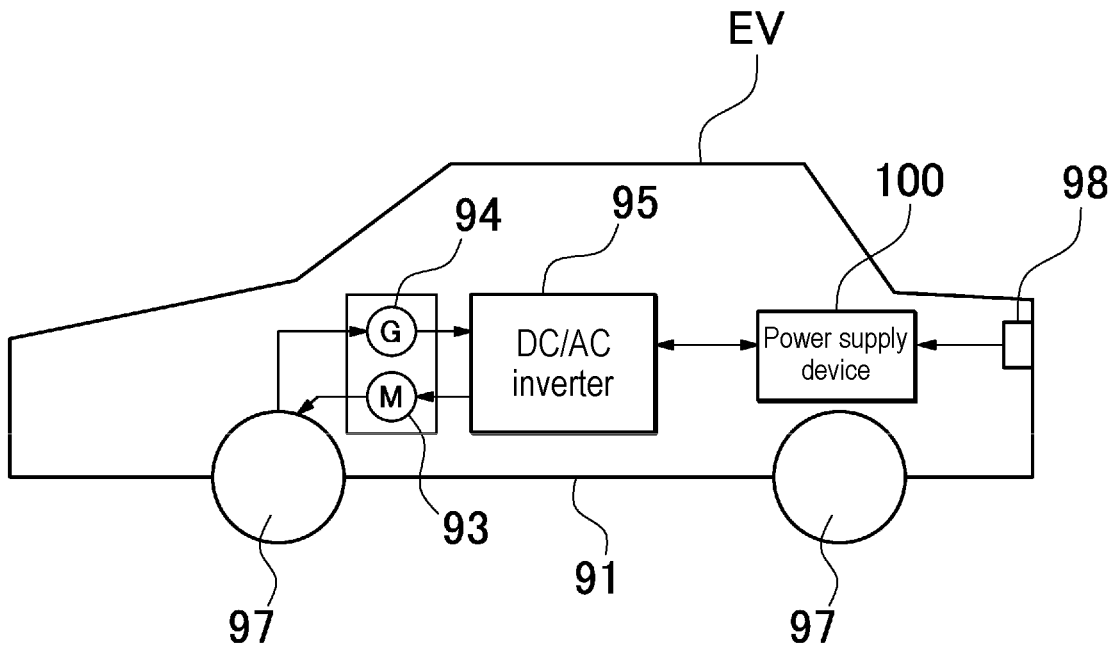
FIG. 12 is a block diagram illustrating an example in which the battery module is mounted on an electric car traveling only by a motor.

Further, FIG. 12 illustrates an example in which a power supply device is mounted on an electric car that travels only with a motor. Vehicle EV illustrated in the drawing on which the power supply device is mounted includes vehicle body 91, motor 93 for traveling that causes vehicle body 91 to travel, wheels 97 driven by motor 93, power supply device 100 that supplies electric power to motor 93, and power generator 94 that charges the battery of power supply device 100. Power supply device 100 is connected to motor 93 and power generator 94 via DC/AC inverter 95. Motor 93 is driven by electric power supplied from power supply device 100. Power generator 94 is driven by the energy at the time of applying regenerative braking to vehicle EV and charges the battery of power supply device 100. Vehicle EV includes charging plug 98, and power supply device 100 can be charged by connecting charging plug 98 to an external power source.

(Power Supply Device for Power Storage Device)

Figure 13:
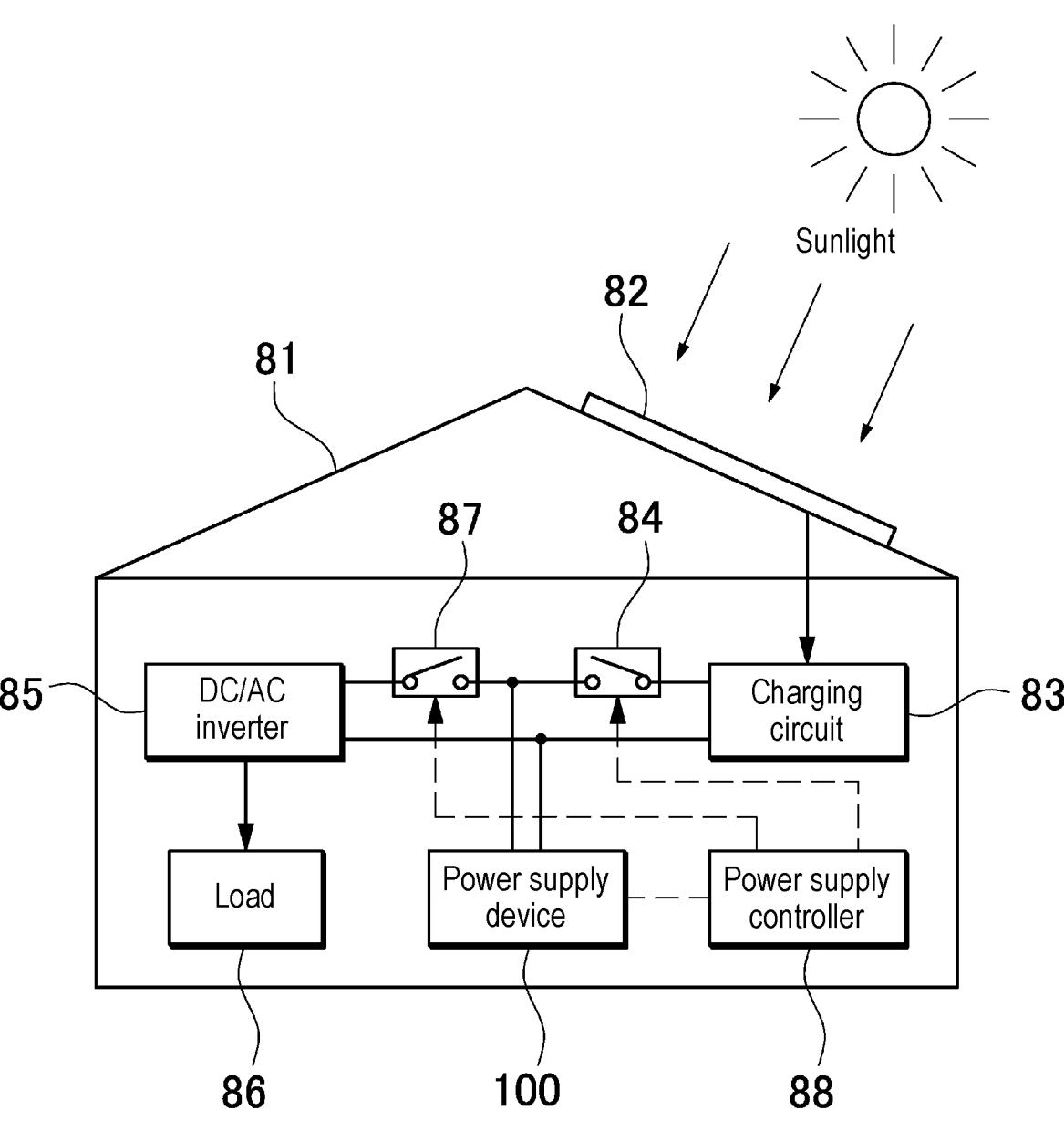
FIG. 13 is a block diagram illustrating an example in which the battery module is used in a power storage device.
Figure 14:
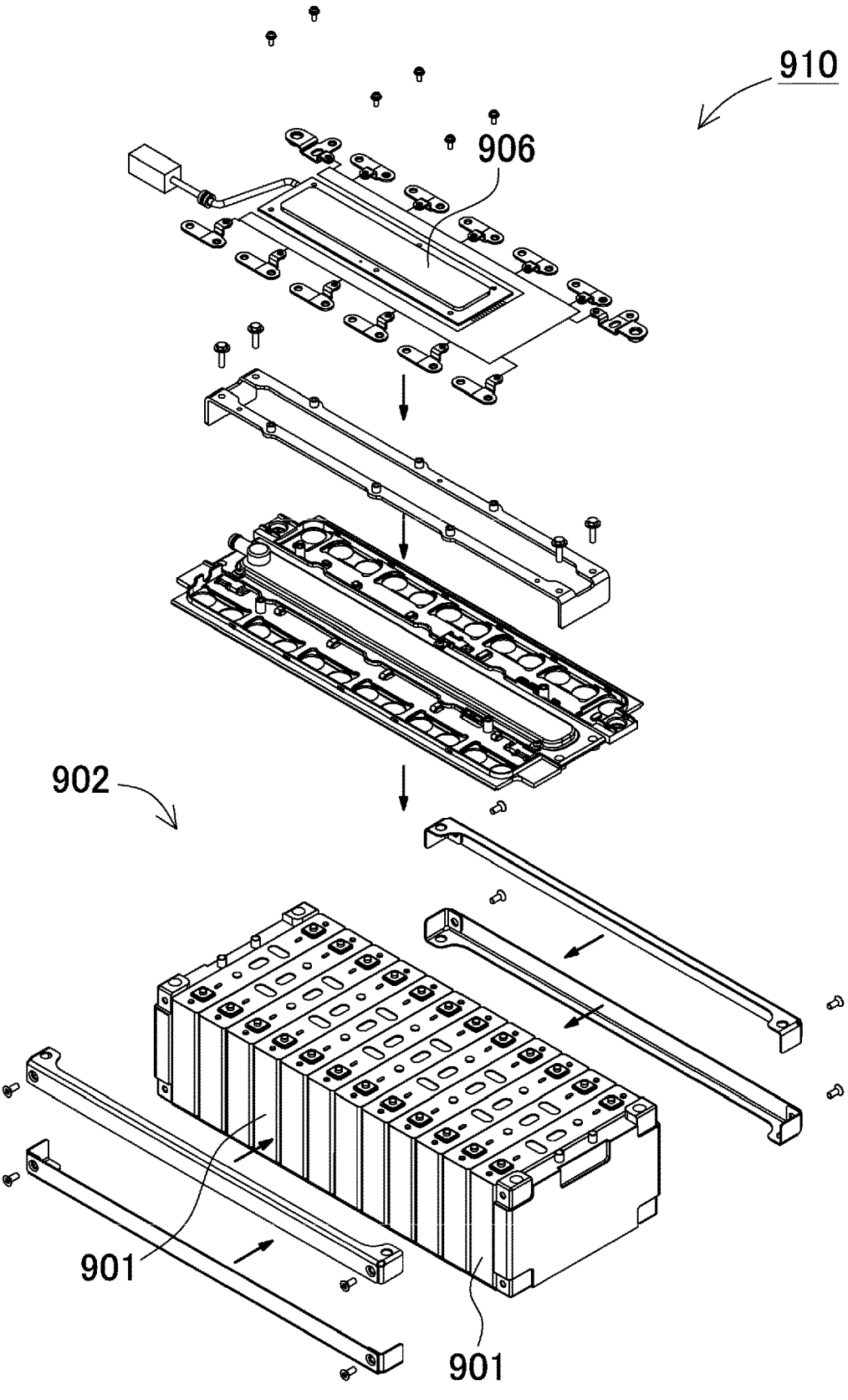
FIG. 14 is an exploded perspective view of a conventional battery module.
Figure 15:
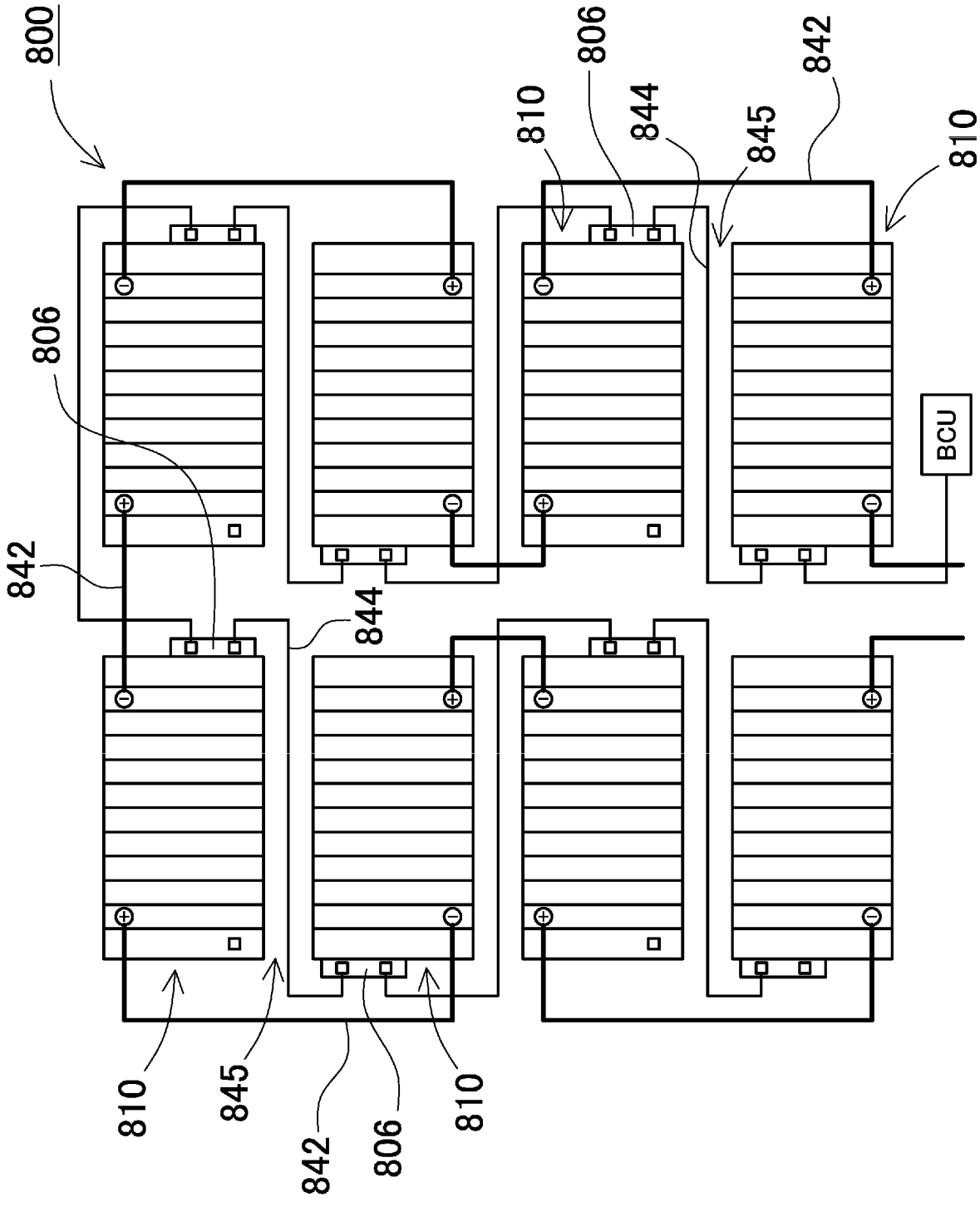
FIG. 15 is a schematic configuration diagram of a conventional power supply device.

The application of the power supply device of the present invention is not limited to a power source for a motor that causes a vehicle to travel. The power supply device according to the exemplary embodiment can also be used as a power source for a power storage device that stores electricity by charging a battery with electric power generated by photovoltaic power generation, wind power generation, or the like. FIG. 13 illustrates a power storage device that charges and stores the batteries of power supply device 100 with solar battery 82.

The power storage device illustrated in FIG. 13 charges the batteries of power supply device 100 with electric power generated by solar battery 82 arranged on a roof, a rooftop, or the like of building 81 such as a house or a factory. The power storage device charges the batteries of power supply device 100 via charging circuit 83 with solar battery 82 serving as a charging power source, and then supplies electric power to load 86 via DC/AC inverter 85. Thus, this power storage device includes a charge mode and a discharge mode. In the power storage device illustrated in the drawing, DC/AC inverter 85 is connected to power supply device 100 via discharging switch 87 and charging circuit 83 is connected to the power supply device via charging switch 84. Discharging switch 87 and charging switch 84 are turned on and off by power supply controller 88 of the power storage device. In the charge mode, power supply controller 88 turns on charging switch 84 and turns off discharging switch 87 to allow charging from charging circuit 83 to power supply device 100. When charging is completed and the battery is fully charged or when the battery is in a state where a capacity of a predetermined value or more is charged, power supply controller 88 turns off charging switch 84 and turns on discharging switch 87 to switch the mode to the discharge mode and allows discharging from power supply device 100 to load 86. When necessary, the power supply controller can supply electric power to load 86 and charge power supply device 100 simultaneously by turning on charging switch 84 and turning on discharging switch 87.

Although not illustrated, the power supply device can also be used as a power source of a power storage device that performs power storage by charging a battery using midnight electric power at night. The power supply device that is charged with midnight electric power is charged with the midnight electric power that is surplus electric power generated by a power station, and outputs the electric power during the daytime when an electric power load increases, which can limit peak electric power during the daytime to a small value. The power supply device can also be used as a power source charged with both output of a solar battery and the midnight electric power. This power supply device can efficiently perform power storage using both electric power generated by the solar battery and the midnight electric power effectively in consideration of weather and electric power consumption.

The power storage device described above can be suitably used for the following applications: a backup power supply device mountable in a rack of a computer server; a backup power supply device used for radio base stations of cellular phones; a power source for power storage used at home or in a factory; a power storage device combined with a solar battery, such as a power supply for street lights; and a backup power supply for traffic lights or traffic displays for roads.

INDUSTRIAL APPLICABILITY

A power supply device according to the present invention can be suitably used as a power source for a plug-in hybrid electric car and a hybrid electric car that can switch between an electric vehicle (EV) traveling mode and a hybrid electric vehicle (HEV) traveling mode, an electric car, and the like. The power supply device can be suitably used for the following applications: a backup power source mountable in a rack of a computer server; a backup power supply device used for radio base stations of cellular phones; a power source for power storage used at home or in a factory; a power storage device combined with a solar battery, such as a power supply for street lights; and a backup power supply for traffic lights or traffic displays for roads.

REFERENCE MARKS IN THE DRAWINGS

100, 200: power supply device
1: battery cell
1$a$: exhaust valve
1X: terminal surface
2: battery stack
3: end plate
4: bind bar
4A: fixing part
4B: lower coupling piece
4C: pressing piece
5: gas duct
5$a$: opening part
6: cell monitor circuit
7: battery assembly
8: cover case
9: base plate
10, 10A, 10B: battery module
11: electrode terminal
12: insulating spacer
13: end surface spacer

14: bus bar
15: fixing screw
16: fixing screw
18: insulating sheet
19: voltage detection line
21: radiator
22: voltage detection circuit
23: cell balance circuit
29: temperature detection circuit
35: battery control unit
41: output terminal
42: power line
43: connection part
44: communication line
46: coupling element
46A: coupling capacitor
46B: transformer
46C: optical transmission element
46$c$: light source
46$d$: photoelectric transducer
48: communication interface
49: transmission and reception circuit
50: detection circuit
51: vertical partitioned region
52: horizontal partitioned region
53: wiring space
54: non-wiring space
81: building
82: solar battery
83: charging circuit
84: charging switch
85: DC/AC inverter
86: load
87: discharging switch
88: power supply controller
91: vehicle body
93: motor
94: power generator
95: DC/AC inverter
96: engine
97: wheel
98: charging plug
800: power supply device
806: cell monitor circuit
810: battery module
842: power line
844: communication line
845: wiring space
859: ground line
901: battery cell
902: battery stack
906: cell monitor circuit
910: battery module
HV, EV: vehicle

The invention claimed is:
1. A power supply device comprising:
a plurality of battery modules each including a plurality of battery cells; and
a power line connecting the plurality of battery modules, wherein each of the battery modules includes a cell monitor circuit that detects battery information,
a plurality of the cell monitor circuits are cascade-connected via a communication line,
the cell monitor circuit includes a communication interface including a connection part for connecting the communication line to the communication interface, the communication interface sets a withstand voltage applied to the connection part to be a voltage higher than an output voltage of the power supply device, and the communication line includes a non-parallel communication line connected to a cell monitor circuit of a battery module different from a battery module to which the power line is connected among the plurality of battery modules.

2. The power supply device according to claim 1, wherein when each of the battery modules is a rectangular-parallelepiped extending in a stacking direction of the battery cell, both ends in the stacking direction of the battery cell are module ends, and both sides in the stacking direction are module side surfaces, the connection part is arranged at the module ends.

3. The power supply device according to claim 2, wherein when a space facing the module ends of the battery modules adjacent to each other is a wiring space, the communication line is wired in the wiring space, and a gap facing the module side surfaces of the battery modules adjacent to each other is a non-wiring space where the communication line is not wired.

4. The power supply device according to claim 2, wherein each of the battery modules includes a battery stack stacking a plurality of battery cells, end plates arranged on both ends of the battery stack, and bind bars that are arranged on both side surfaces of the battery stack to couple the end plates, each of the battery modules is an elongated rectangular-parallelepiped in a stacking direction of corresponding one of the battery cells, and ends in a longitudinal direction are module ends.

5. The power supply device according to claim 4, wherein, in the battery module, the cell monitor circuit is arranged on each of the end plates.

6. The power supply device according to claim 1, wherein, in the battery module, the connection part is arranged at one end.

7. The power supply device according to claim 6, wherein in the battery module, a pair of connection parts is arranged at one end, and the communication line is connected to the pair of connection parts.

8. An electric vehicle comprising:

the power supply device according to claim 1;

a motor for traveling that receives electric power from the power supply device;

a vehicle body on which the power supply device and the motor are mounted; and wheels that are driven by the motor and cause the vehicle body to travel.

9. A power storage device comprising:

the power supply device according to claim 1;

a power supply controller that controls charging and discharging of the power supply device, wherein the power supply controller performs control for enabling charging of the battery cells by electric power from an outside and charging the battery cell.

10. A power supply device comprising:

a plurality of battery modules each including a plurality of battery cells; and a power line connecting the plurality of battery modules, wherein each of the battery modules includes a cell monitor circuit that detects battery information, a plurality of the cell monitor circuits are cascade-connected via a communication line, the cell monitor circuit includes a communication interface including a connection part for connecting the communication line to the communication interface, the communication interface sets a withstand voltage applied to the connection part to be a voltage higher than an output voltage of the power supply device, the communication interface includes a coupling element that blocks a direct current to cause an alternating current to pass on an output side of the communication interface, and a withstand voltage of the coupling element is higher than the output voltage of the power supply device.

11. The power supply device according to claim 10, wherein the communication line includes a non-parallel communication line connected to a cell monitor circuit of a battery module different from a battery module to which the power line is connected among the plurality of battery modules.

12. The power supply device according to claim 10, wherein the coupling element is any one of a coupling capacitor, a signal transmission transformer, and an optical transmission element.

13. A power supply device comprising:

a plurality of battery modules each including a plurality of battery cells; and a power line connecting the plurality of battery modules, wherein each of the battery modules includes a cell monitor circuit that detects battery information, a plurality of the cell monitor circuits are cascade-connected via a communication line, the cell monitor circuit includes a communication interface including a connection part for connecting the communication line to the communication interface, the communication interface sets a withstand voltage applied to the connection part to be a voltage higher than an output voltage of the power supply device, the plurality of the battery modules are arranged in multiple stages and multiple rows, vertical partitioned regions and horizontal partitioned regions are provided in a grid pattern between the battery modules adjacent to each other, any one of (i) the vertical partitioned regions and (ii) the horizontal partitioned regions are wiring spaces where the communication line is wired, and the other of (i) the vertical partitioned regions and (ii) the horizontal partitioned regions are non-wiring spaces where the communication line is not wired.

14. The power supply device according to claim 13, wherein each of the non-wiring spaces has a horizontal width narrower than a horizontal width of each of the wiring spaces.

15. The power supply device according to claim 13, wherein, in the battery module, the connection part is arranged at an end facing the wiring space.

* * * * *